(12) United States Patent
Murata et al.

(10) Patent No.: US 11,483,497 B2
(45) Date of Patent: Oct. 25, 2022

(54) ENCODING APPARATUS AND METHOD, IMAGE CAPTURE APPARATUS, AND STORAGE MEDIUM

(71) Applicant: CANON KABUSHIKI KAISHA, Tokyo (JP)

(72) Inventors: Takafumi Murata, Tokyo (JP); Shigeki Mochizuki, Kanagawa (JP); Ryota Suzuki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/327,538

(22) Filed: May 21, 2021

(65) Prior Publication Data

US 2021/0377467 A1 Dec. 2, 2021

(30) Foreign Application Priority Data

May 29, 2020 (JP) .............................. JP2020-094912
Nov. 11, 2020 (JP) .............................. JP2020-188302

(51) Int. Cl.
*H04N 5/353* (2011.01)
*H04N 9/04* (2006.01)

(52) U.S. Cl.
CPC ........... *H04N 5/353* (2013.01); *H04N 9/0451* (2018.08)

(58) Field of Classification Search
CPC .... H04N 5/353; H04N 9/0451; H04N 5/2355; H04N 5/35554; H04N 5/35563; H04N 19/124; H04N 19/63; H04N 9/04515

USPC ...................................................... 348/207.99
See application file for complete search history.

(56) References Cited

U.S. PATENT DOCUMENTS

| | | | |
|---|---|---|---|
| 2015/0029358 A1* | 1/2015 | Kaizu .................. | H04N 5/2355 348/223.1 |
| 2019/0182483 A1 | 6/2019 | Oishi | |
| 2020/0068151 A1* | 2/2020 | Pourreza Shahri .. | H04N 5/2356 |
| 2020/0137290 A1* | 4/2020 | Lee ........................ | H04N 19/46 |

FOREIGN PATENT DOCUMENTS

| | | |
|---|---|---|
| JP | 2013-021660 A | 1/2013 |
| WO | 2016167140 A1 | 10/2016 |
| WO | 2020051305 A1 | 3/2020 |

OTHER PUBLICATIONS

Daniel Tamburrino et al: "Digital camera workflow for high dynamic range images using a model of retinal processing", Proceedings of SPIE, Feb. 14, 2008(Feb. 14, 2008), p. 68170J, XP055044529, ISSN: 0277-786X, DOI: 10.1117/12.767728.

* cited by examiner

*Primary Examiner* — Lin Ye
*Assistant Examiner* — Chan T Nguyen
(74) *Attorney, Agent, or Firm* — Canon U.S.A., Inc. IP Division

(57) ABSTRACT

An apparatus comprises a generating unit configured to generate a plurality of pieces of RAW data for respective exposure times from RAW data obtained from a sensor that can perform shooting at an exposure time that is different for each pixel, and an encoding unit configured to encode the generated plurality of pieces of RAW data.

25 Claims, 31 Drawing Sheets

FIG. 2

| R | R | G1 | G1 | R | R | G1 | G1 |
|---|---|----|----|---|---|----|----|
| R | R | G1 | G1 | R | R | G1 | G1 |
| G2 | G2 | B | B | G2 | G2 | B | B |
| G2 | G2 | B | B | G2 | G2 | B | B |
| R | R | G1 | G1 | R | R | G1 | G1 |
| R | R | G1 | G1 | R | R | G1 | G1 |
| G2 | G2 | B | B | G2 | G2 | B | B |
| G2 | G2 | B | B | G2 | G2 | B | B |

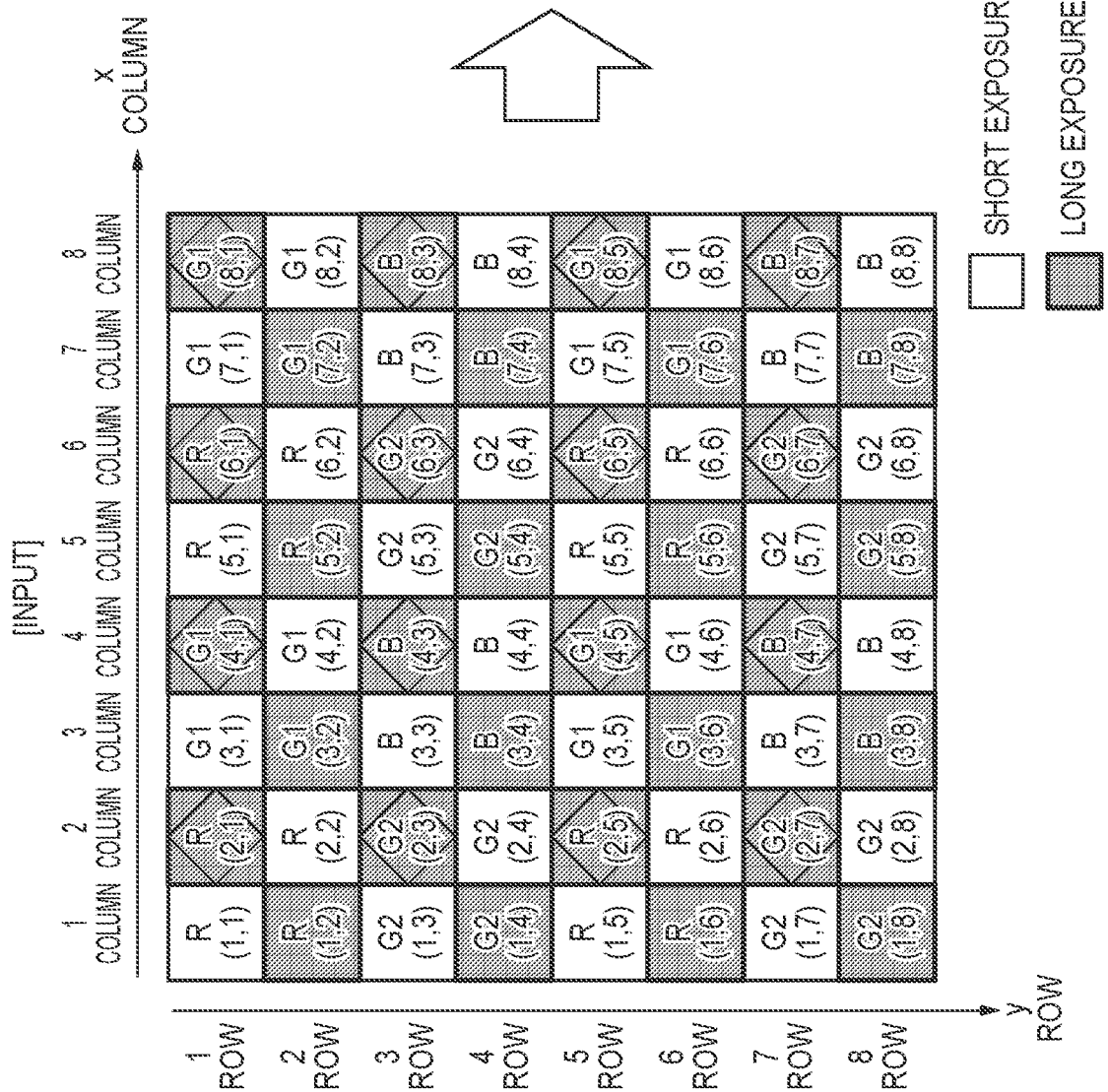

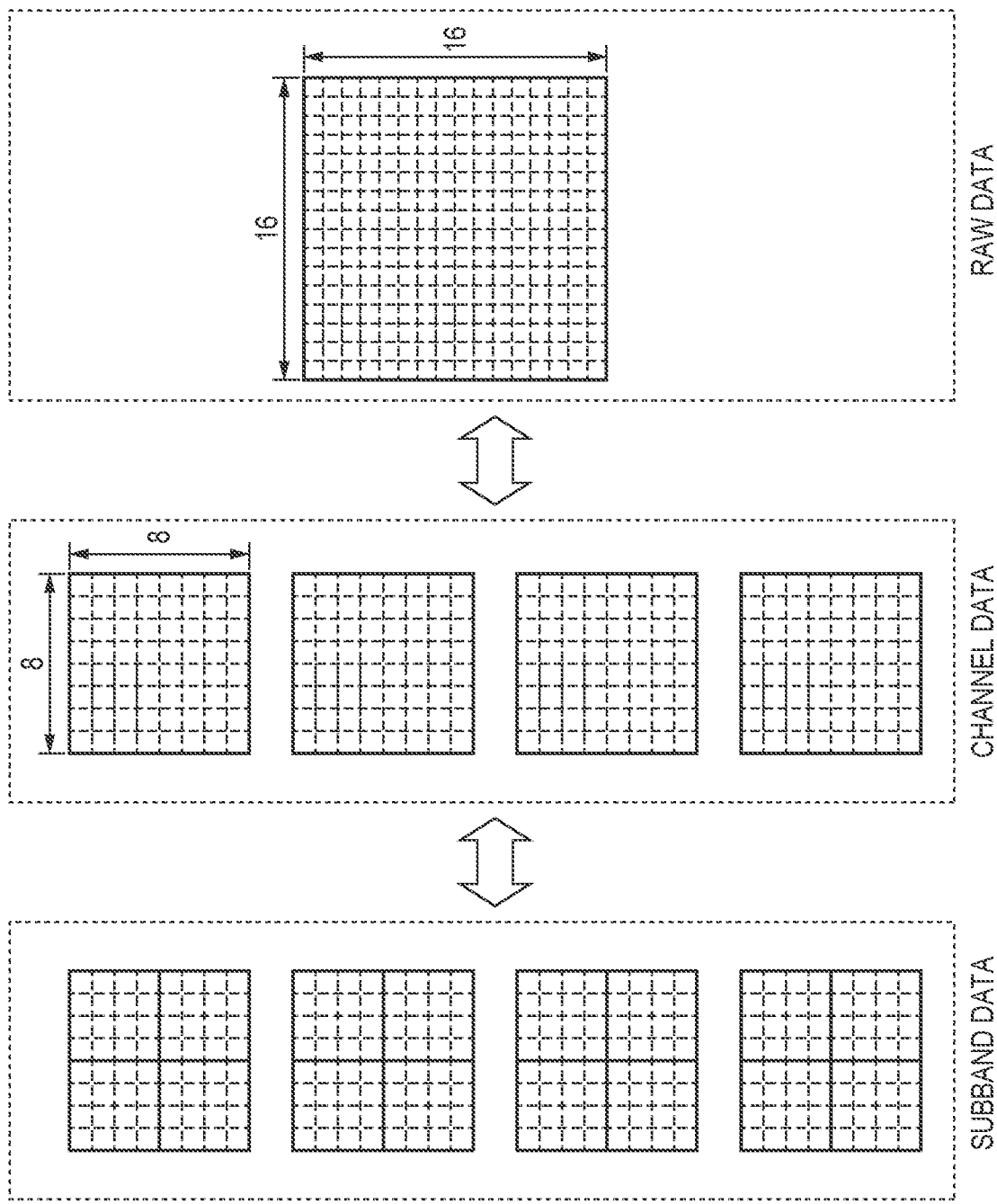

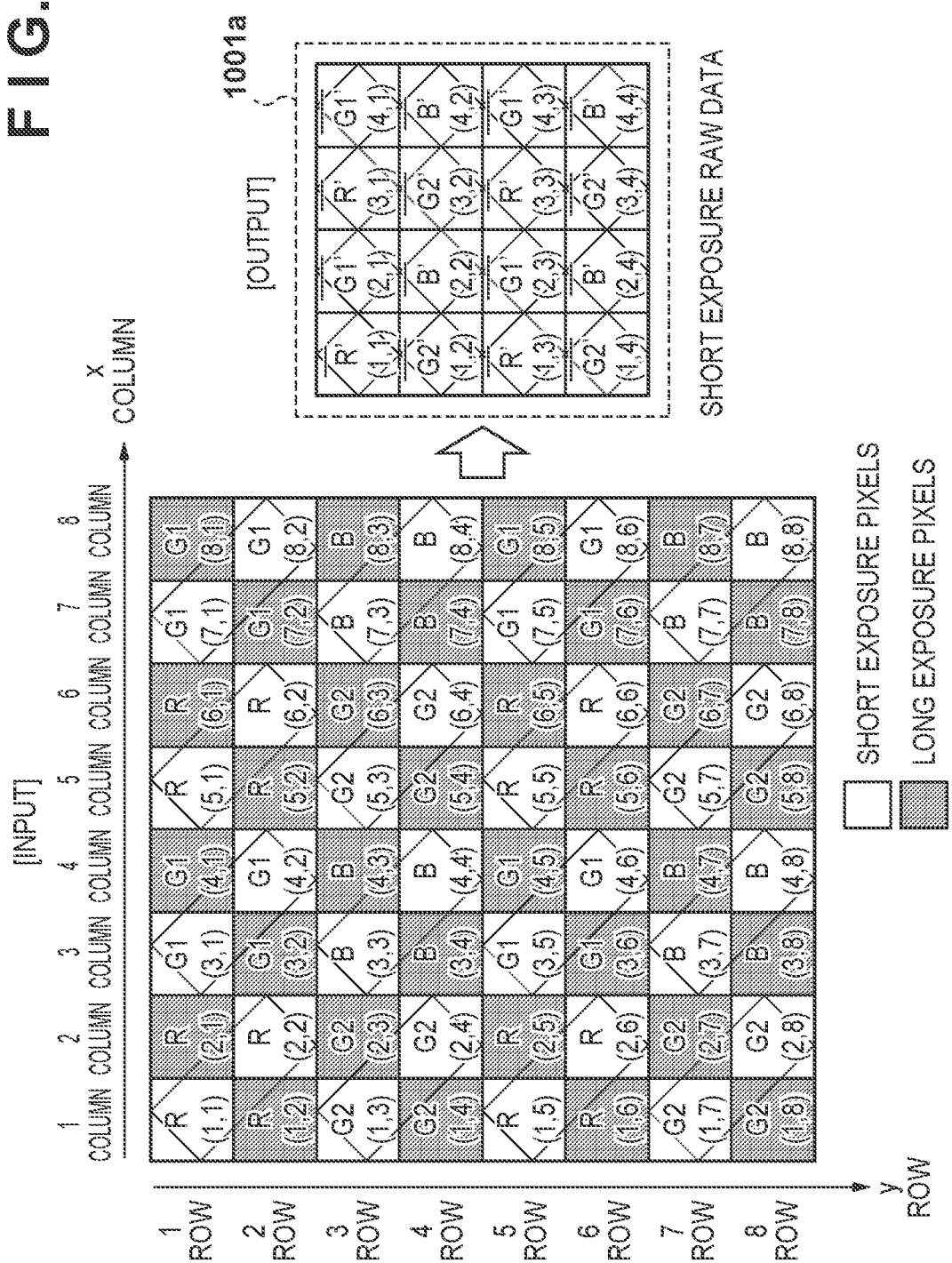

F I G. 15A
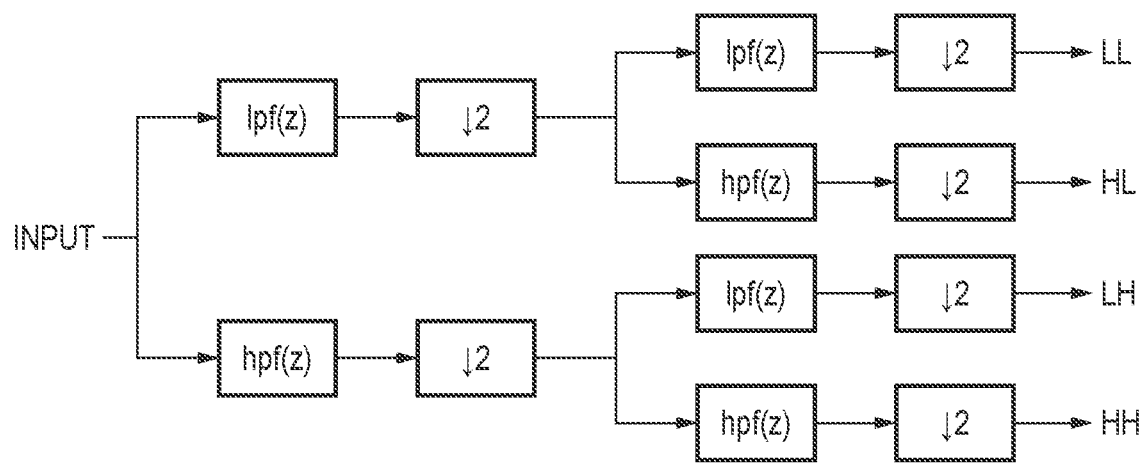
F I G. 15B
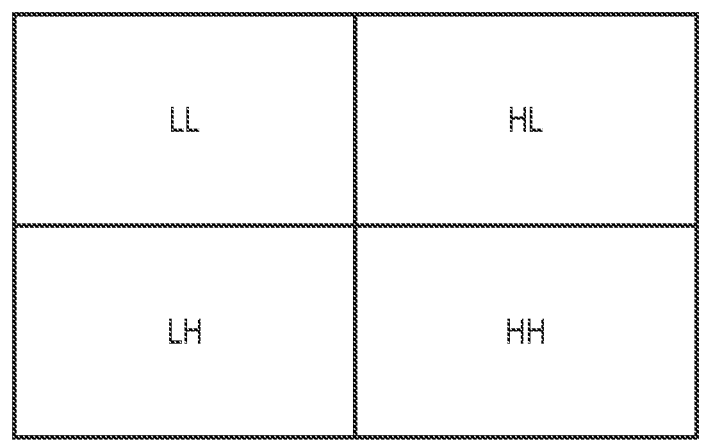

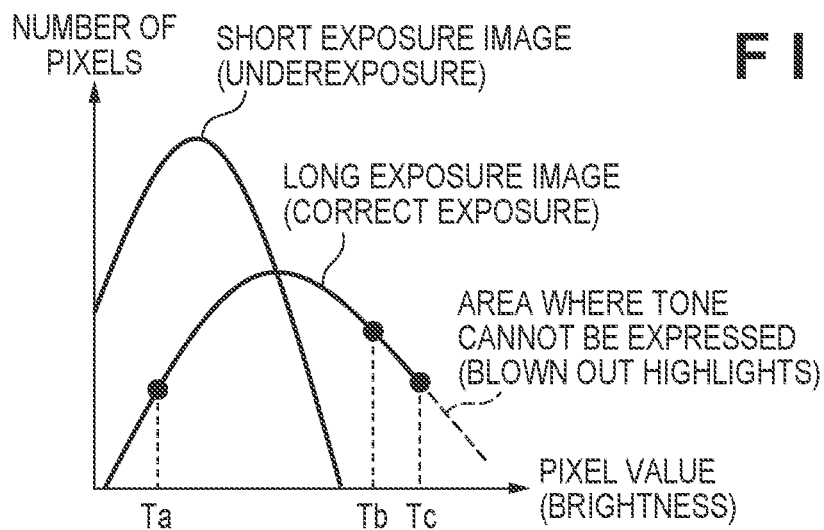
FIG. 17A
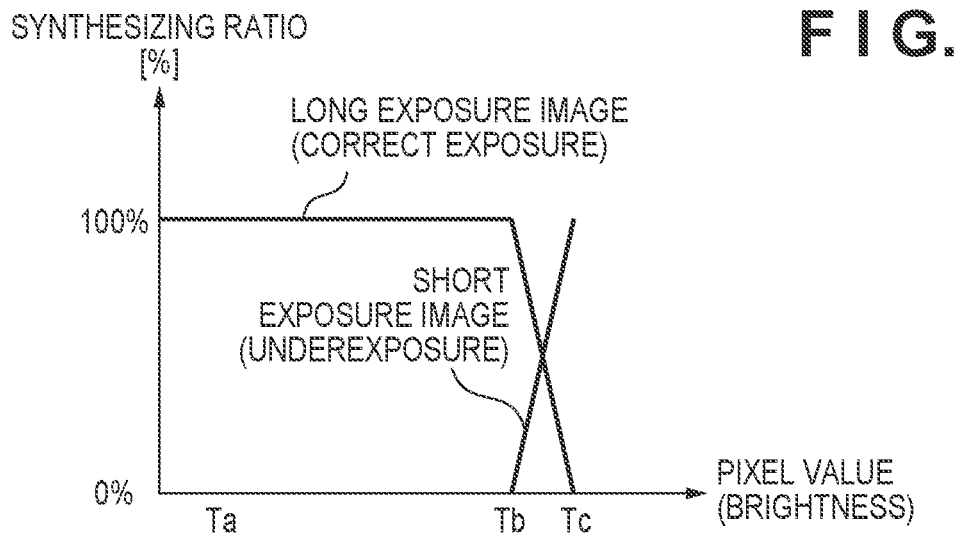
FIG. 17B
FIG. 17C
| IMAGE | SYNTHESIZING RATIO [%] | | |
|---|---|---|---|
| | DARK PORTION (PIXEL VALUE ≤ Ta) | MEDIUM (Ta < PIXEL VALUE ≤ Tb) | BRIGHT PORTION (Tb < PIXEL VALUE) |
| LONG EXPOSURE IMAGE (CORRECT EXPOSURE) | A0 | A1 | A2 |
| SHORT EXPOSURE IMAGE (UNDEREXPOSURE) | A3 | A4 | A5 |

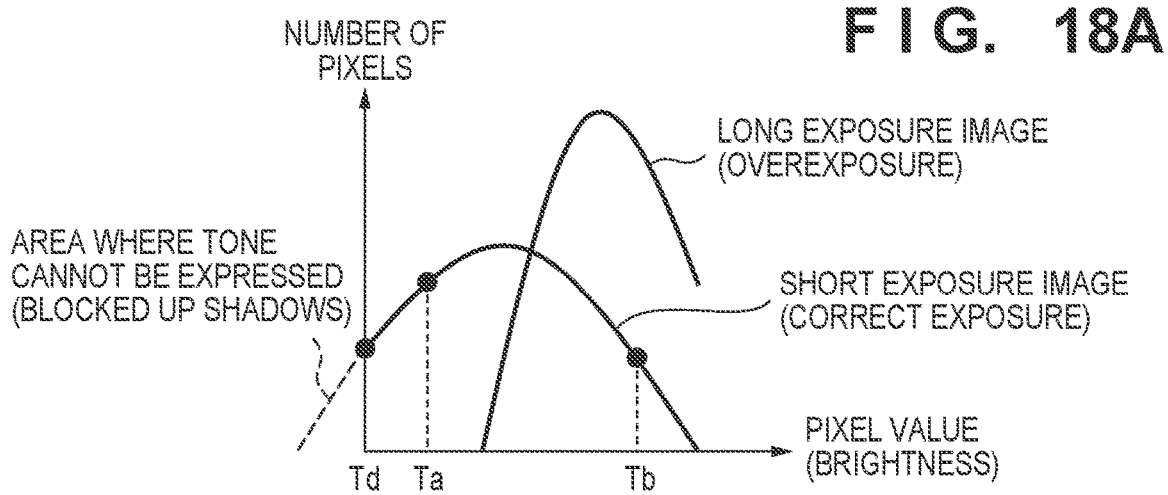
FIG. 18A
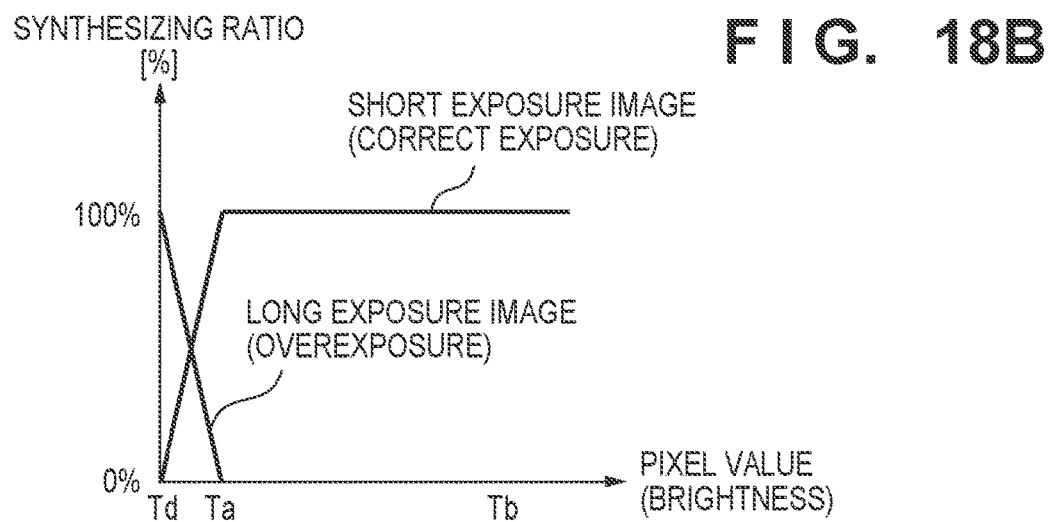
FIG. 18B
FIG. 18C
| IMAGE | SYNTHESIZING RATIO [%] | | |
|---|---|---|---|
| | DARK PORTION (PIXEL VALUE ≤ Ta) | MEDIUM (Ta < PIXEL VALUE ≤ Tb) | BRIGHT PORTION (Tb < PIXEL VALUE) |
| SHORT EXPOSURE IMAGE (CORRECT EXPOSURE) | B0 | B1 | B2 |
| LONG EXPOSURE IMAGE (OVEREXPOSURE) | B3 | B4 | B5 |

FIG. 19A

|  | DARK PORTION | MEDIUM | BRIGHT PORTION |
|---|---|---|---|
| ADDITION AVERAGE RAW DATA | Q0 | Q1 | Q2 |

FIG. 19B

|  | DARK PORTION | MEDIUM | BRIGHT PORTION |
|---|---|---|---|
| SHORT EXPOSURE RAW DATA (CORRECT EXPOSURE) | Q3 | Q1 | Q2 |
| LONG EXPOSURE RAW DATA (OVEREXPOSURE) | Q4 | Q3 | Q3 |

FIG. 19C

|  | DARK PORTION | MEDIUM | BRIGHT PORTION |
|---|---|---|---|
| LONG EXPOSURE RAW DATA (CORRECT EXPOSURE) | Q0 | Q1 | Q3 |
| SHORT EXPOSURE RAW DATA (UNDEREXPOSURE) | Q3 | Q3 | Q5 |

ENCODING APPARATUS AND METHOD, IMAGE CAPTURE APPARATUS, AND STORAGE MEDIUM

BACKGROUND OF THE DISCLOSURE

Field of the Disclosure

The aspect of the embodiments relates to a technique for encoding and recording an image obtained by an image sensor that can control the exposure time for each pixel.

Description of the Related Art

In known image capture apparatuses, raw image information (RAW data) obtained by capturing performed by an image sensor is converted to signals constituted by luminance and color differences by applying debayering processing (demosaicing processing), and so-called developing processing such as noise removal, optical distortion correction, and image optimization is performed on each signal. Also, in general, a luminance signal and color difference signals that have been subjected to the developing processing are compression-encoded and recorded in a recording medium.

On the other hand, there are also image capture apparatuses that store image capture data (RAW data) that is in a state of immediately after being output from the image sensor and has not been subjected to developing processing in a recording medium. When the RAW data is recorded, data saving can be performed in a state of retaining abundant number of color tones without the color information from an image sensor being degraded, and therefore editing with a high degree of freedom can be performed. However, there may be issue in that the recording data amount of RAW data is huge, and a lot of free space is needed in the recording media. Therefore, it may be desirable that the RAW data is also subjected to compression encoding, and is recorded while the data amount being suppressed.

Incidentally, an image capture device is known with which, as a result of arranging pixels that are different in exposure time on the same plane, as disclosed in Japanese Patent Laid-Open No. 2013-21660, an image having a wide dynamic range can be obtained with one instance of shooting, as a device for obtaining a high dynamic range image. A synthesizing method for generating a high dynamic range image at the time of development when such an image capture device is used is disclosed in Japanese Patent Laid-Open No. 2013-21660.

However, in the known technique disclosed in Japanese Patent Laid-Open No. 2013-21660 described above, a method of encoding RAW data before subjected to synthesizing is not disclosed.

Also, when an image capture device as described in Japanese Patent Laid-Open No. 2013-21660 is used, if RAW data before subjected to synthesizing is tried to be encoded, because the level difference between pixels that are different in exposure time and are arranged on the same plane is large, a large amount of high frequency components are generated, and as a result, the coding efficiency drops.

SUMMARY OF THE DISCLOSURE

According to a first aspect of the embodiments, there is provided an apparatus comprising: at least one processor; and a memory coupled to the at least one processor, the memory having instructions that, when executed by the at least processor, perform operations as: a generating unit configured to generate a plurality of pieces of RAW data for respective exposure times from RAW data obtained from a sensor that can perform shooting at an exposure time that is different for each pixel; and an encoding unit configured to encode the generated plurality of pieces of RAW data.

According to a second aspect of the embodiments, there is provided an apparatus comprising: a sensor that can control the exposure time for each pixel: and an encoding apparatus comprising: at least one processor; and a memory coupled to the at least one processor, the memory having instructions that, when executed by the at least processor, perform operations as: a generating unit configured to generate a plurality of pieces of RAW data for respective exposure times from RAW data obtained from an image sensor that can perform shooting at an exposure time that is different for each pixel; and an encoding unit configured to encode the generated plurality of pieces of RAW data.

According to third aspect of the embodiments, there is provided a method comprising: generating a plurality of pieces of RAW data for respective exposure times from RAW data obtained from a sensor that can perform shooting at an exposure time that is different for each pixel; and encoding the generated plurality of pieces of RAW data.

Further features of the disclosure will become apparent from the following description of exemplary embodiments with reference to the attached drawings.

BRIEF DESCRIPTION OF THE DRAWINGS

FIG. 2 is a diagram illustrating a pixel array of an image capture unit.

FIG. 4C is a diagram illustrating the separating method of RAW data in the first embodiment.

FIG. 8 is a diagram illustrating an example of a unit for generating a quantization parameter.

FIGS. 10A and 10B are diagrams illustrating a separating method of RAW data in a second embodiment.

FIGS. 15A and 15B are diagrams illustrating frequency transform (subband division).

FIGS. 17A to 17C are diagrams illustrating a synthesizing ratio in the HDR synthesizing processing when a long exposure image is of correct exposure.

FIGS. 18A to 18C are diagrams illustrating a synthesizing ratio in the HDR synthesizing processing when a short exposure image is of correct exposure.

FIGS. 19A to 19C are diagrams illustrating an exemplary setting of the quantization parameter.

DESCRIPTION OF THE EMBODIMENTS

Figure 1:
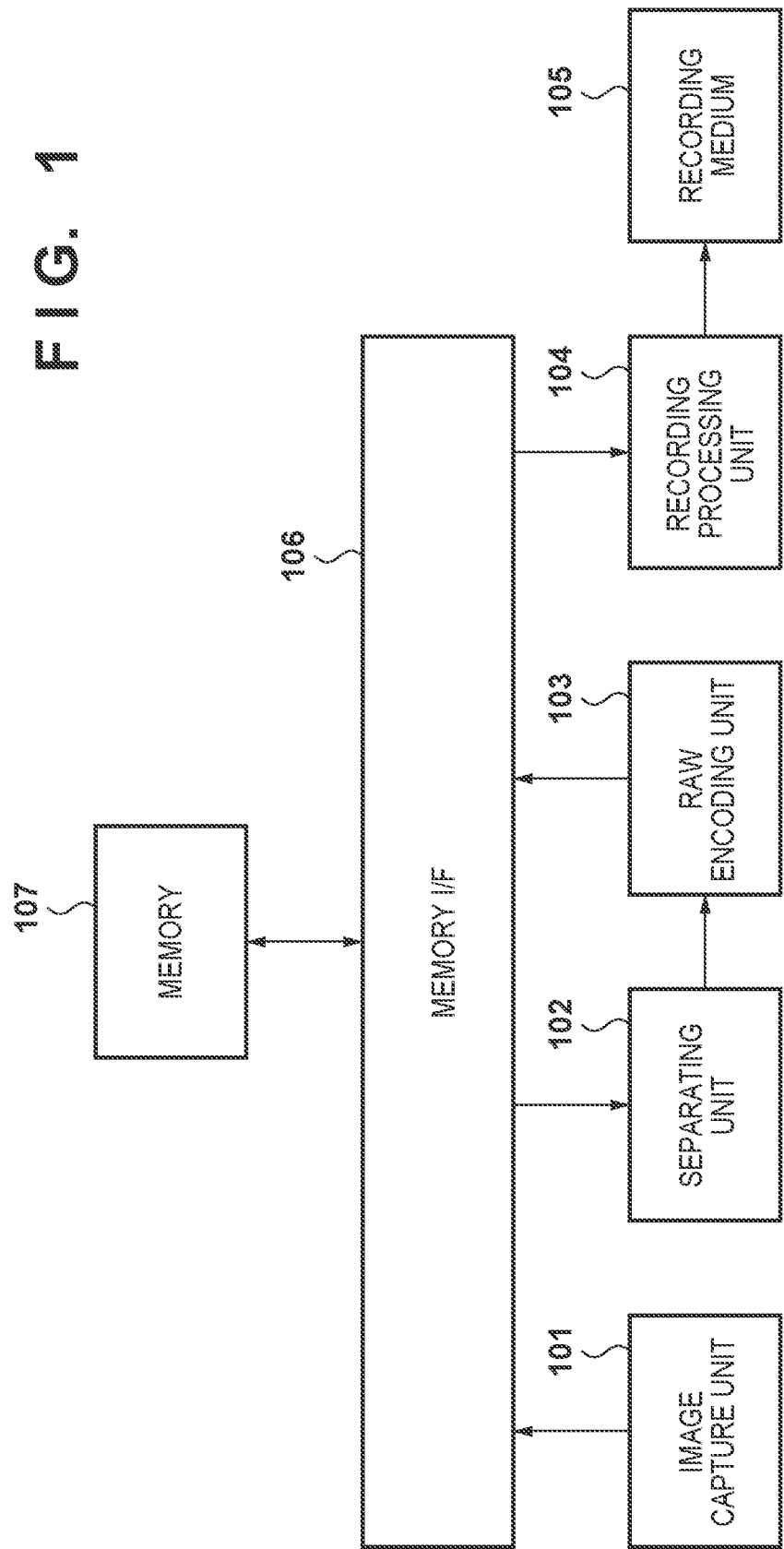
FIG. 1 is a block diagram illustrating a functional configuration of a digital camera that is a first embodiment of an encoding apparatus of the disclosure.

Hereinafter, embodiments will be described in detail with reference to the attached drawings. Note, the following embodiments are not intended to limit the scope of the disclosure. Multiple features are described in the embodiments, but limitation is not made such that requires all such features, and multiple such features may be combined as appropriate. Furthermore, in the attached drawings, the same reference numerals are given to the same or similar configurations, and redundant description thereof is omitted.

First Embodiment

FIG. 1 is a block diagram illustrating a functional configuration of a digital camera 100 that is a first embodiment of an encoding apparatus of the disclosure. The digital camera 100 includes an image capture unit 101, a separating unit 102, a RAW encoding unit 103, a recording processing unit 104, a recording medium 105, a memory I/F (memory interface) 106, and a memory 107.

The image capture unit 101 includes a lens optical system that includes an optical lens, an aperture, a focus controller, and a lens driving unit, and is capable of optical zoom, and an image sensor in which a plurality of pixels each including a photoelectric conversion element are two-dimensionally arranged.

The image sensor performs photoelectric conversion, in each pixel, on a subject image formed by the lens optical system, and also performs analog/digital conversion with an A/D conversion circuit, and outputs a digital signal (pixel data, RAW data) in units of pixel. A CCD image sensor, a CMOS image sensor, or the like is used as the image sensor.

Note that, in the present embodiment, each pixel of the image sensor is provided with one of R (red), G1/G2 (green), and B (blue) color filters, as shown in FIG. 2. Note that the RAW data output from the image capture unit 101 is stored in the memory 107 via the memory I/F 106.

The separating unit 102 is a circuit or a module for separating the RAW data obtained by the image capture unit 101 into pieces of RAW data for respective exposure times. The RAW data stored in the memory 107 is read out via the memory I/F 106, and is separated into pieces of RAW data for respective exposure times, which are output to the RAW encoding unit 103.

The RAW encoding unit 103 is a circuit or a module that performs computational operations on RAW data, and encodes the RAW data input from the separating unit 102.

The RAW encoding unit 103 stores coded data generated by encoding in the memory 107 via the memory I/F 106.

The recording processing unit 104 reads out various types of data such as coded data that are stored in the memory 107 via the memory I/F 106, and records the read-out data in the recording medium 105. The recording medium 105 is a recording media that is constituted by a large capacity random access memory such as a nonvolatile memory.

The memory I/F 106 mediates memory access requests from the processing units, and performs reading/writing control with respect to the memory 107. The memory 107 is a volatile memory such as an SDRAM, and functions as storage means. The memory 107 provides a storage area for storing the aforementioned various types of data such as image data and sound data, or various types of data output from the processing units that constitute the digital camera 100.

Next, the pixel arrangement structure of the image capture unit 101 will be described with reference to FIG. 2. As shown in FIG. 2, the image capture unit 101 is characterized in that R pixels, G1 pixels, G2 pixels, and B pixels are arranged in units of 2×2 pixels, and the same color is arranged in each 2×2 pixels. The image capture unit 101 has a structure in which the total 4×4 pixels is a minimum unit, and the minimum unit repeatedly arranged.

Figure 3:
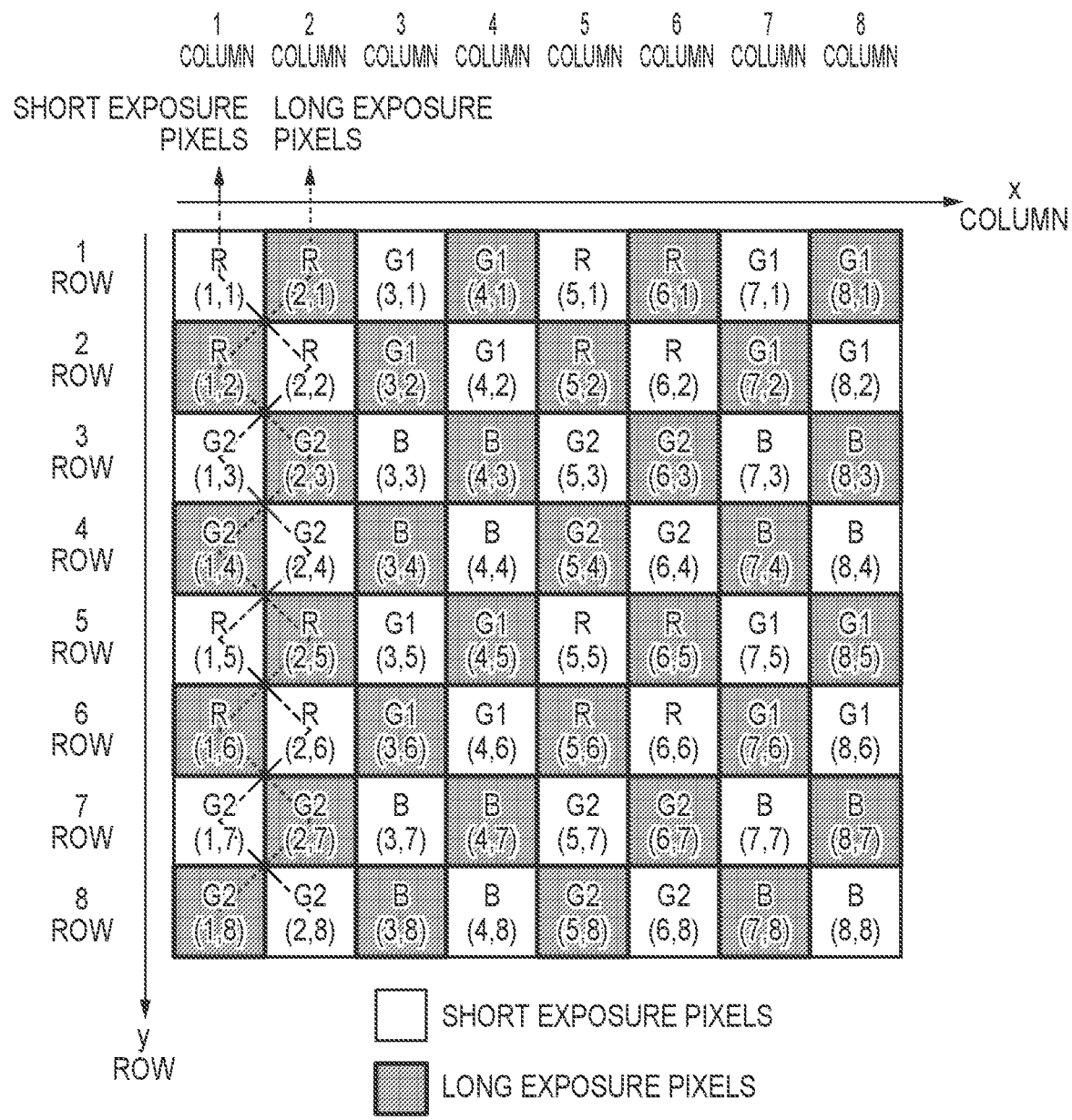
FIG. 3 is a diagram illustrating the pixel array of the image capture unit and setting of exposure time.

The setting of exposure time in an image sensor that has the pixel arrangement structure shown in FIG. 2, and in which the exposure time can be controlled for each pixel (shooting is possible with an exposure time that is different for each pixel) will be described with reference to FIG. 3. As shown in FIG. 3, the horizontal direction is denoted by x, the vertical direction is denoted by y, the column number is represented by an x coordinate, and the row number is represented by a y coordinate. The numbers with parentheses indicate the coordinates indicating the position of each pixel on the image sensor. Also, white pixels represent short exposure pixels, and gray pixels represent long exposure pixels. In the present embodiment, short exposure pixels that perform short exposure and long exposure pixels that perform long exposure are set in a zigzag manner in the column direction, as shown in FIG. 3.

For example, the setting of exposure time regarding four R pixels at an upper left end in FIG. 3 is as follows. R(1,1) is a short exposure pixel, R(2,1) is a long exposure pixel, R(1,2) is a long exposure pixel, and R(2,2) is a short exposure pixel. In this way, a short exposure pixel and a long exposure pixel are alternatingly set in each column, and a short exposure pixel and a long exposure pixel are alternatingly set in each row. When the short exposure pixels are followed in the y direction, in the first and second columns, in the first row from the above, the first column is a short exposure pixel, in the second row, the second column is a short exposure pixel, in the third row, the first column is a short exposure pixel, and in the fourth row, the second column is a short exposure pixel. Similarly, when the long exposure pixels are followed in the y direction, in the first and second columns, in the first row from the above, the second column is a long exposure pixel, in the second row, the first column is a long exposure pixel, in the third row, the second column is a long exposure pixel, and in the fourth row, the first column is a long exposure pixel.

As described above, the pixel arrangement structure and the setting of the exposure time are set such that pixels of the same color are set in units of 2×2 pixels, and two short exposure pixels (one of two exposure times) and two long exposure pixels (the other of two exposure times) are arranged in those 4 pixels.

Here, if encoding is tried to be performed in a state in which the RAW data is as obtained by the image capture unit 101, that is, in a state in which pixels that are different in exposure time are mixed, because the level difference between pixels that are different in exposure time is large, a large amount of high frequency component is generated, and a recording data amount of the RAW data increases. Therefore, in the present embodiment, the RAW data is separated into pieces of RAW data of the respective exposure times by the separating unit 102, and generation of high frequency component is suppressed by matching the level between pixels, and with this, the recording data amount of RAW data is reduced.

Next, the separating method will be described with reference to FIGS. 4A to 4D. The separating unit 102 separates the RAW data input from the image capture unit 101 into Bayer arrangement structure RAW data that is constituted by short exposure pixels and Bayer arrangement structure RAW data that is constituted by long exposure pixels, as shown in FIGS. 4A to 4D, and outputs the separated two pieces of RAW data to the RAW encoding unit 103.

Figure 4A:
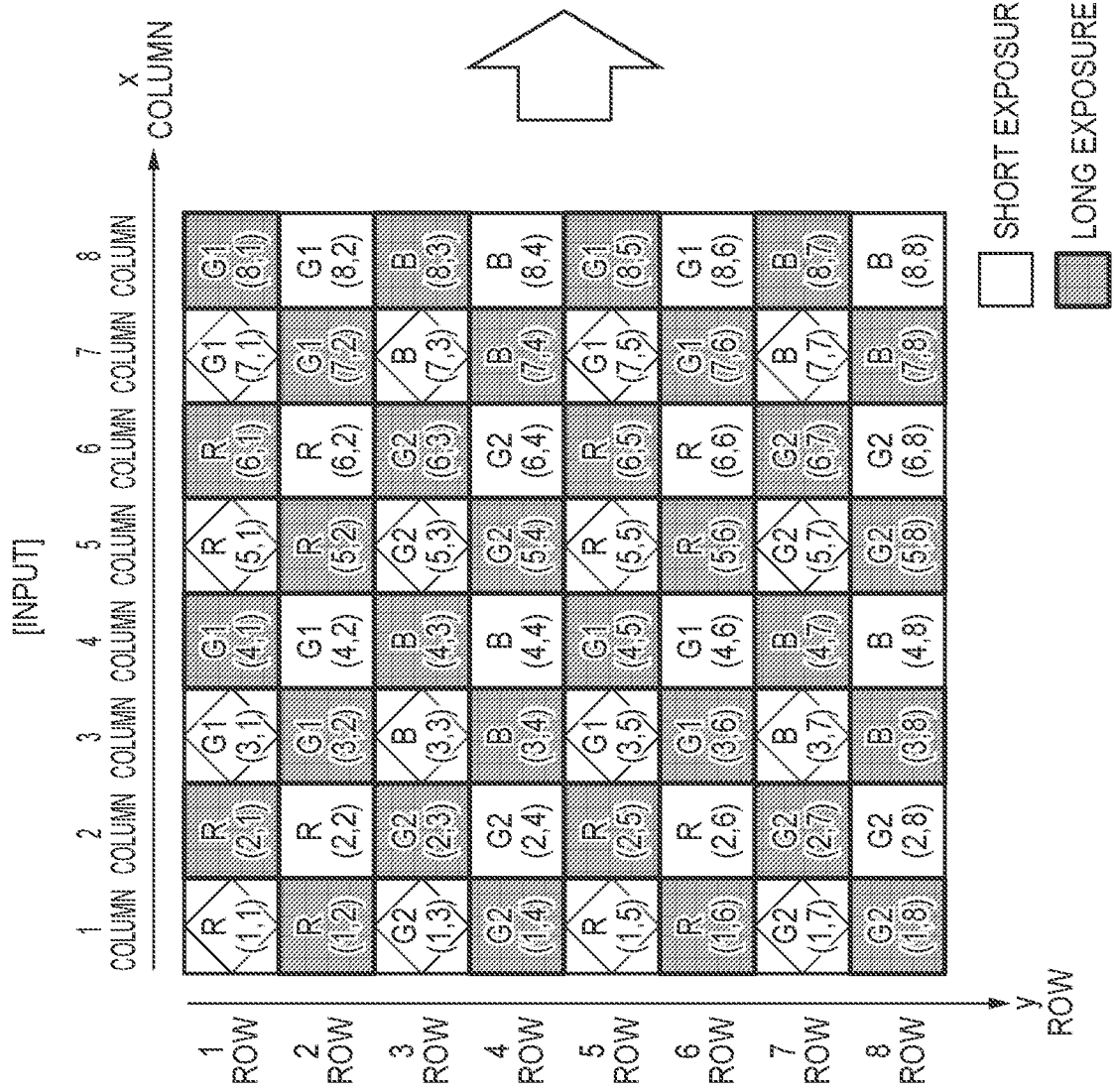
FIG. 4A is a diagram illustrating a separating method of RAW data in the first embodiment.
Figure 4B:
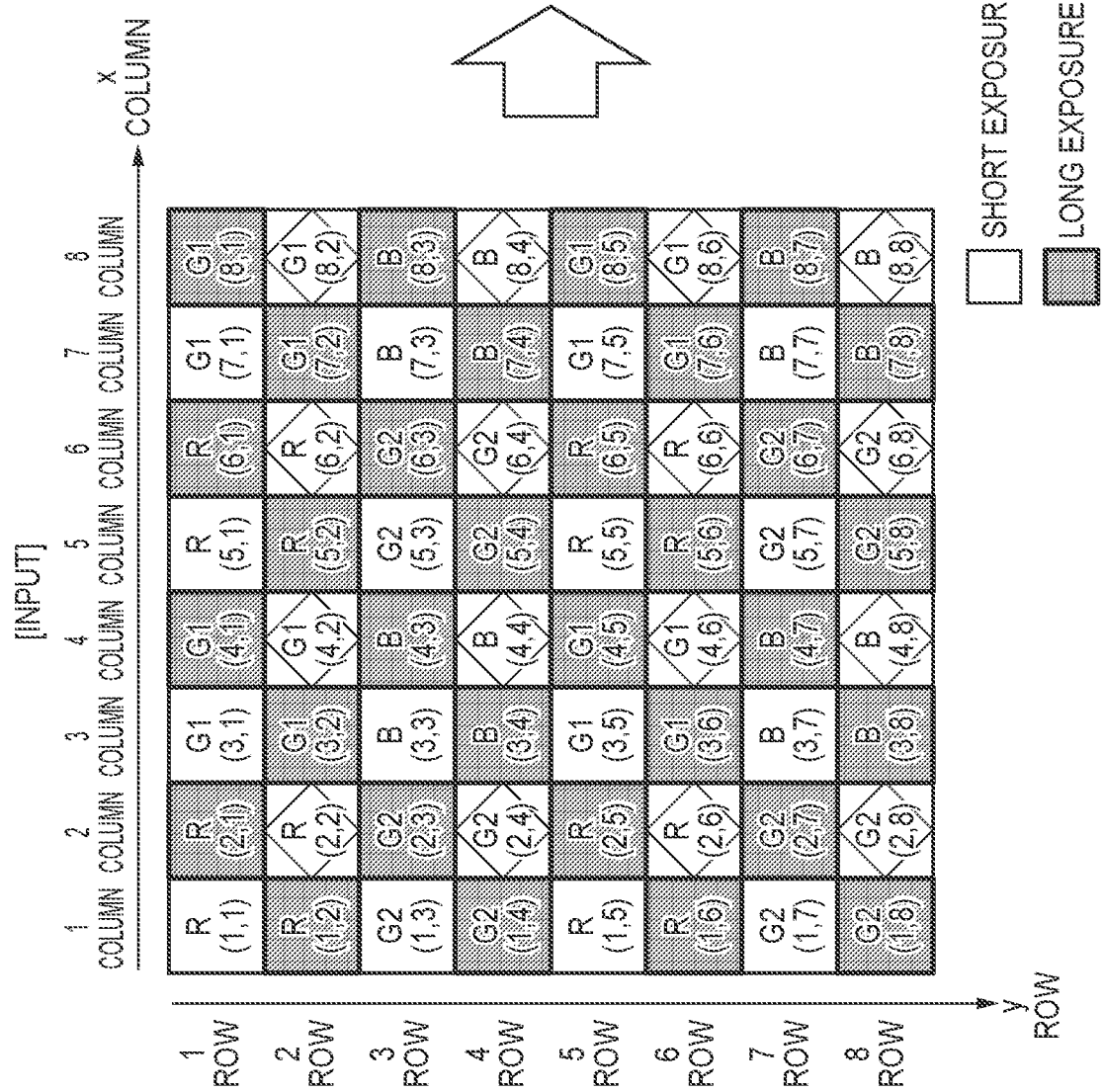
FIG. 4B is a diagram illustrating the separating method of RAW data in the first embodiment.

Specifically, the RAW data constituted by short exposure pixels is separated into two planes of short exposure RAW data that are illustrated by RAW data 401a in FIG. 4A and RAW data 401b in FIG. 4B. The RAW data 401a is short exposure RAW data that is configured by extracting short exposure pixels each marked by a rhombus in odd-numbered rows and in odd-numbered columns, as shown in FIG. 4A. Also, the RAW data 401b is short exposure RAW data that is configured by extracting short exposure pixels each marked by a rhombus in even-numbered rows and in even-numbered columns, as shown in FIG. 4B.

Figure 4D:
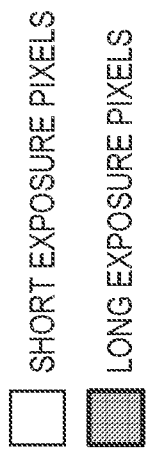
FIG. 4D is a diagram illustrating the separating method of RAW data in the first embodiment.

Similarly, the RAW data constituted by long exposure pixels is separated into two planes of long exposure RAW data that are illustrated by RAW data 401c in FIG. 4C and RAW data 401d in FIG. 4D. The RAW data 401c is long exposure RAW data that is configured by extracting long exposure pixels each marked by a rhombus in odd-numbered rows and in even-numbered columns, as shown in FIG. 4C. Also, the RAW data 401d is long exposure RAW data that is configured by extracting long exposure pixels each marked by a rhombus in even-numbered rows and in odd-numbered columns, as shown in FIG. 4D. The RAW encoding unit 103 separately encodes RAW data 401a, 401b, 401c, and 401d that are input in a Bayer arrangement manner from the separating unit 102.

Note that the separating method of the separating unit 102 when the exposure time is different between pixels arranged on the same plane has been described above using the pixel array in FIG. 2. Next, the processing to be performed by the separating unit 102 when the exposure times of the pixels are all the same will be described with reference to FIG. 5.

Figure 5:
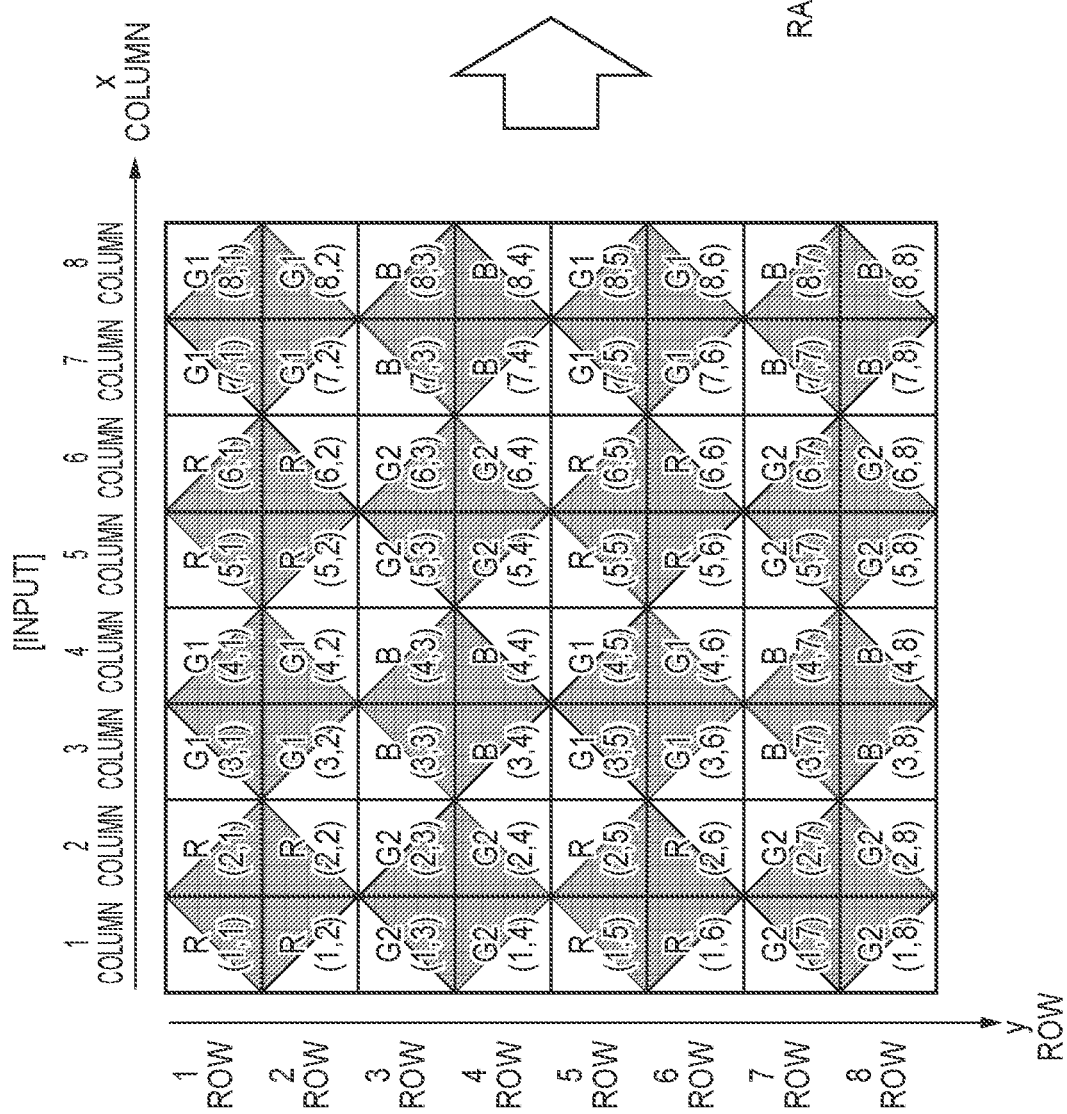
FIG. 5 is a diagram illustrating RAW data output when the exposure times of pixels are the same.

In this case, the separating unit 102 configures RAW data 501 by calculating a pixel average value of each four pixels of the same color component that are marked by a gray rhombus, as shown in FIG. 5, with respect to the RAW data obtained by the image capture unit 101, and outputs the RAW data 501 to the RAW encoding unit 103. Specifically, as shown in the following Formulas 1 to 4, separation is performed by calculating addition averages for each color component.

$$\{R(1,1)+R(2,1)+R(1,2)+R(2,2)\}/4=\overline{R}(1,1) \quad \text{Formula 1}$$

$$\{G1(3,1)+G1(4,1)+G1(3,2)+G1(4,2)\}/4=\overline{G1}(2,1) \quad \text{Formula 2}$$

$$\{G2(1,3)+G2(2,3)+G2(1,4)+G2(2,4)\}/4=\overline{G2}(1,2) \quad \text{Formula 3}$$

$$\{B(3,3)+B(4,3)+B(3,4)+B(4,4)\}/4=\overline{B}(2,2) \quad \text{Formula 4}$$

Figure 6:
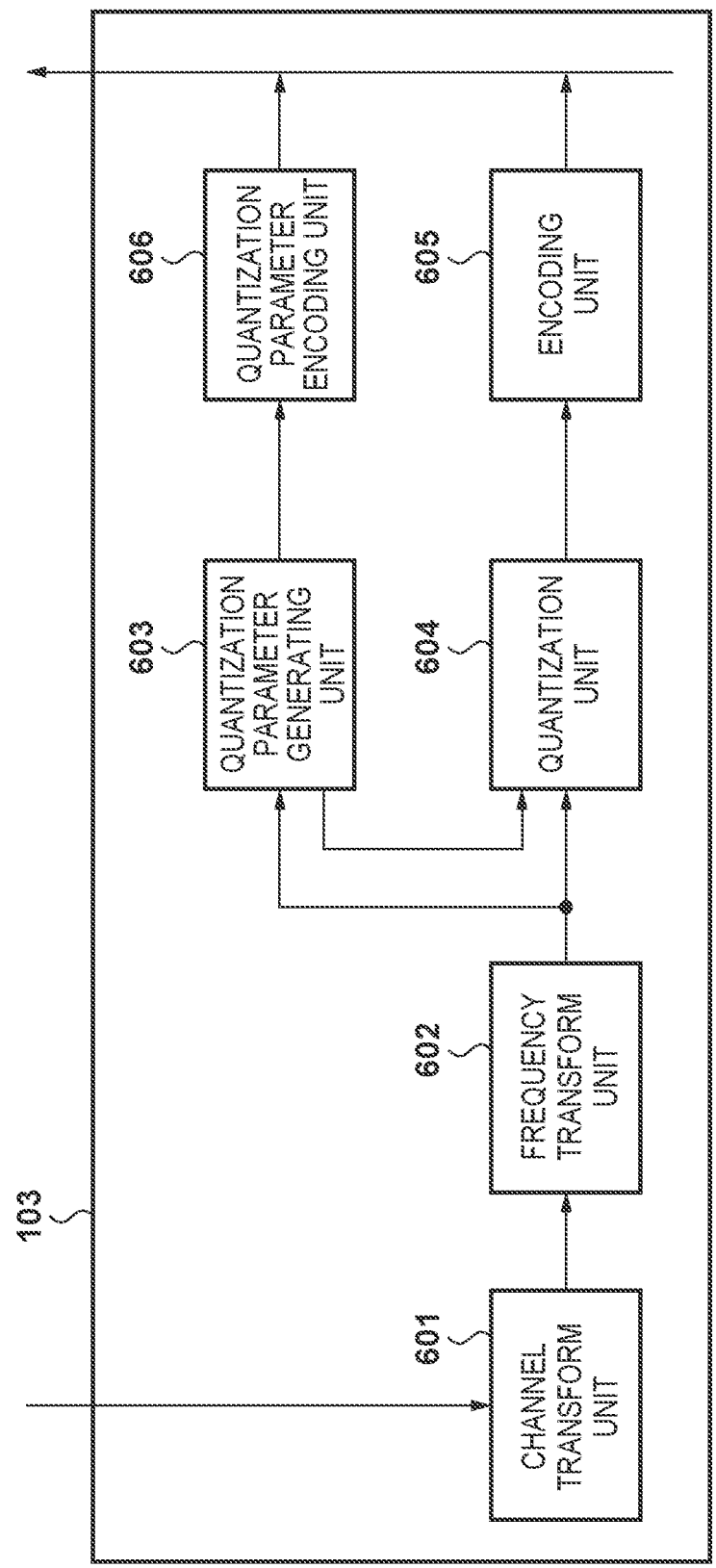
FIG. 6 is a block diagram illustrating a configuration of a RAW encoding unit.

Next, the detailed configuration of the RAW encoding unit 103 that performs processing on the short exposure RAW data 401a and 401b and the long exposure RAW data 401c and 401d and the processing flow will be described with reference to the block diagram shown in FIG. 6.

The RAW encoding unit 103 includes a channel transform unit 601, a frequency transform unit 602, a quantization parameter generating unit 603, a quantization unit 604, an encoding unit 605, and a quantization parameter encoding unit 606.

The channel transform unit 601 transforms RAW data configured as in the Bayer arrangement that is input from the separating unit 102 into a plurality of channels. For example, transformation is performed into four channels separately for R, G1, G2, and B of the Bayer arrangement. Alternatively, with respect to R, G1, G2, and B, transformation into four channels is performed by further performing calculation using the following transform formulas 5 to 8.

$$Y=(R+G1+G2+B)/4 \quad \text{Formula 5}$$

$$C0=R-B \quad \text{Formula 6}$$

$$C1=(G0+G1)/2-(R+B)/2 \quad \text{Formula 7}$$

$$C2=G0-G1 \quad \text{Formula 8}$$

Note that, an exemplary configuration for transforming into four channels is shown here, but the number of channels and the transform method are not limited thereto.

The frequency transform unit 602 performs frequency transform processing by discrete wavelet transform at a predetermined resolution level (hereinafter, denoted as "lev") for each channel, and outputs generated subband data (transform coefficient) to the quantization parameter generating unit 603 and the quantization unit 604.

Figure 7A:
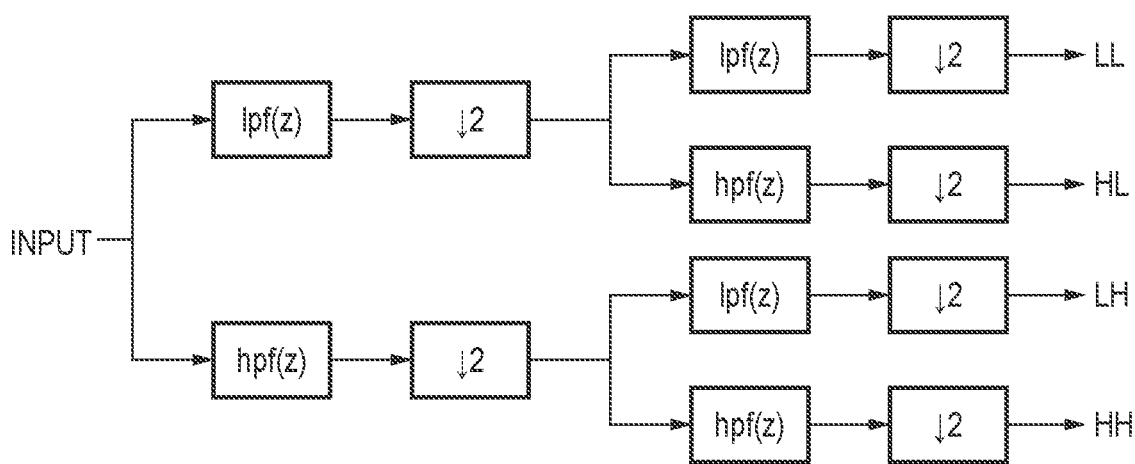
FIGS. 7A and 7B are diagrams illustrating an example of frequency transform (subband division).
Figure 7B:
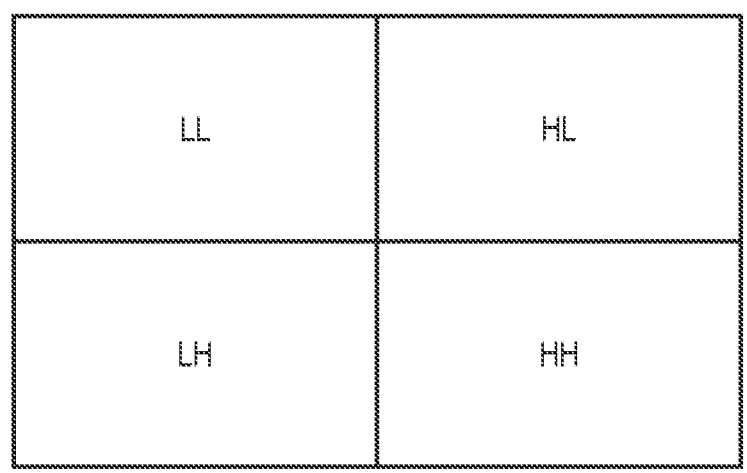

FIG. 7A shows a filter bank configuration for realizing the discrete wavelet transform regarding the subband division processing at lev=1. When the discrete wavelet transform processing is executed in the horizontal and vertical directions, division into one low frequency subband (LL) and three high frequency subbands (HL, LH, HH) is performed, as shown in FIG. 7B.

The transfer functions of the low pass filter (hereinafter, denoted as "lpf") and the high pass filter (hereinafter, denoted as "hpf") shown in FIG. 7A are respectively shown in Formulas 9 and 10.

$$\text{lpf}(z)=(-z^{-2}+2z^{-1}+6+2z^{1}-z^{2})/8 \quad \text{Formula 9}$$

$$\text{hpf}(z)=(-z^{-1}+2-z^{1})/2 \quad \text{Formula 10}$$

When lev is larger than 1, subband division is hierarchically executed with respect to the low frequency subband (LL). Note that, here, the discrete wavelet transform is configured by a five tap lpf and a three tap hpf, as shown in Formulas 9 and 10, but there is no limitation thereto, and a filter configuration in which the number of taps and the coefficients are different may be adopted.

The quantization parameter generating unit 603 generates a quantization parameter for performing quantization processing on the subband data (transform coefficient) generated by the frequency transform unit 602 for each certain predetermined subband data unit. The generated quantization parameter is input to the quantization parameter encoding unit 606, and is also supplied to the quantization unit 604.

The quantization unit 604 performs quantization processing on the subband data (transform coefficient) output from the frequency transform unit 602 based on the quantization parameter supplied from the quantization parameter generating unit 603, and outputs the quantized subband data (transform coefficient) to the encoding unit 605.

The encoding unit 605 performs predictive difference entropy coding of the quantized subband data (transform coefficient) output from the quantization unit 604 for each subband in a raster scan order, and stores the generated encoded RAW data to the memory 107. Note that other methods may be used as the prediction method and the entropy coding method.

The quantization parameter encoding unit 606 is a processing unit for performing encoding on the quantization parameter input from the quantization parameter generating unit 603. The quantization parameter is encoded using the encoding method in common with the encoding unit 605, and the generated encoded quantization parameter is stored to the memory 107.

Next, the relationship between the subband data, the channel data, and the RAW data will be described with reference to FIG. 8 when the quantization parameter is generated assuming that the aforementioned predetermined subband unit is 4×4.

The 4×4 subband corresponds to 8×8 pixels for each channel, as shown in FIG. 8, and also corresponds to a block corresponding to 16×16 pixels of each RAW data. Therefore, in this case, the quantization parameter is to be stored in the memory 107 for each RAW data block corresponding to 16×16 pixels, in the short exposure RAW data 401*a* and 401*b* and the long exposure RAW data 401*c* and 401*d*.

Note that it is effective to apply the same quantization parameter to the short exposure RAW data 401*a* and 401*b*, and to the long exposure RAW data 401*c* and 401*d* in order to reduce the data amount of the quantization parameter. In this case, the data amount can be reduced to half. Also, in the present embodiment, using the quantization parameter that is generated at an exposure time closer to the correct exposure as a reference, and the other quantization parameter is calculated, in order to further reduce the data amount. With this, the data amount of the quantization parameter can be reduced to quarter. Here, the reason why the quantization parameter that is generated at an exposure time closer to the correct exposure is used as the reference is because, with an overexposure or underexposure image in which blown out highlights or blacked out occurs, the quantization parameter cannot be generated according to an accurate feature of the subject.

When short exposure is closer to the correct exposure, as a specific example, the calculation formula for calculating the quantization parameter for the long exposure RAW data with the quantization parameter generated regarding the short exposure RAW data being the reference is shown in Formula 11.

$$L\_Qp = \alpha \times S\_Qp + \beta \quad \text{Formula 11}$$

Here,
L_Qp: quantization parameter for long exposure RAW data
S_Qp: quantization parameter for short exposure RAW data
α: slope
β: intercept.

Note that, in the present embodiment, the quantization parameter for the long exposure RAW data is calculated with the quantization parameter generated for the short exposure RAW data being the reference. However, the quantization parameter for the short exposure RAW data may be calculated with the quantization parameter generated for the long exposure RAW data being the reference. Also, the quantization parameter may be calculated by setting α and β for each of short exposure and long exposure while using neither of short exposure and long exposure as the reference.

Next, the determination method of α and β shown in Formula 11 will be described. Although α and β may be any values, in the present embodiment, a detailed parameter determination method will be described. When the short exposure is assumed to be closer to the correct exposure, as in the example described above, in the long exposure, overexposure is achieved because the exposure time is longer than the short exposure. Therefore, it is highly possible that, regarding an area in which brightness is medium to bright at the short exposure, the pixel value reaches a saturation level at the long exposure, and the pixel value according to the brightness of a subject cannot be output. On the other hand, regarding a dark area, it is possible to obtain detailed information relative to the short exposure. Therefore, the quantization parameter for the long exposure RAW data is increased relative to the short exposure regarding an area that is determined to be an area in which the brightness is medium to bright in the short exposure RAW data. Also, the same parameter is set regarding an area that is determined to be dark, and as a result, the data amount of the quantization parameter can be reduced while ensuring the image quality.

Figure 9A:
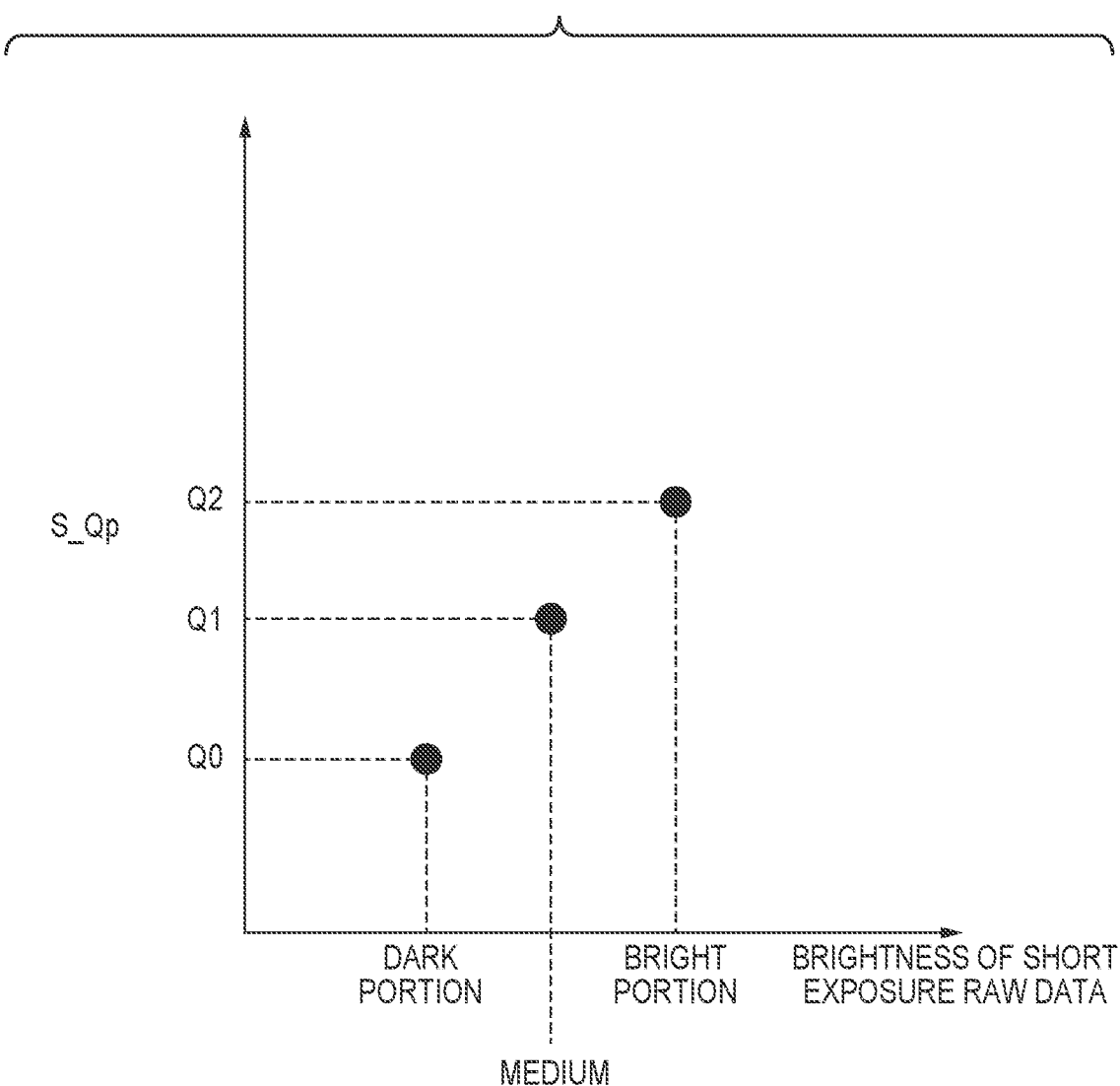
FIG. 9A is a diagram illustrating an exemplary generation of the quantization parameter.
Figure 9B:
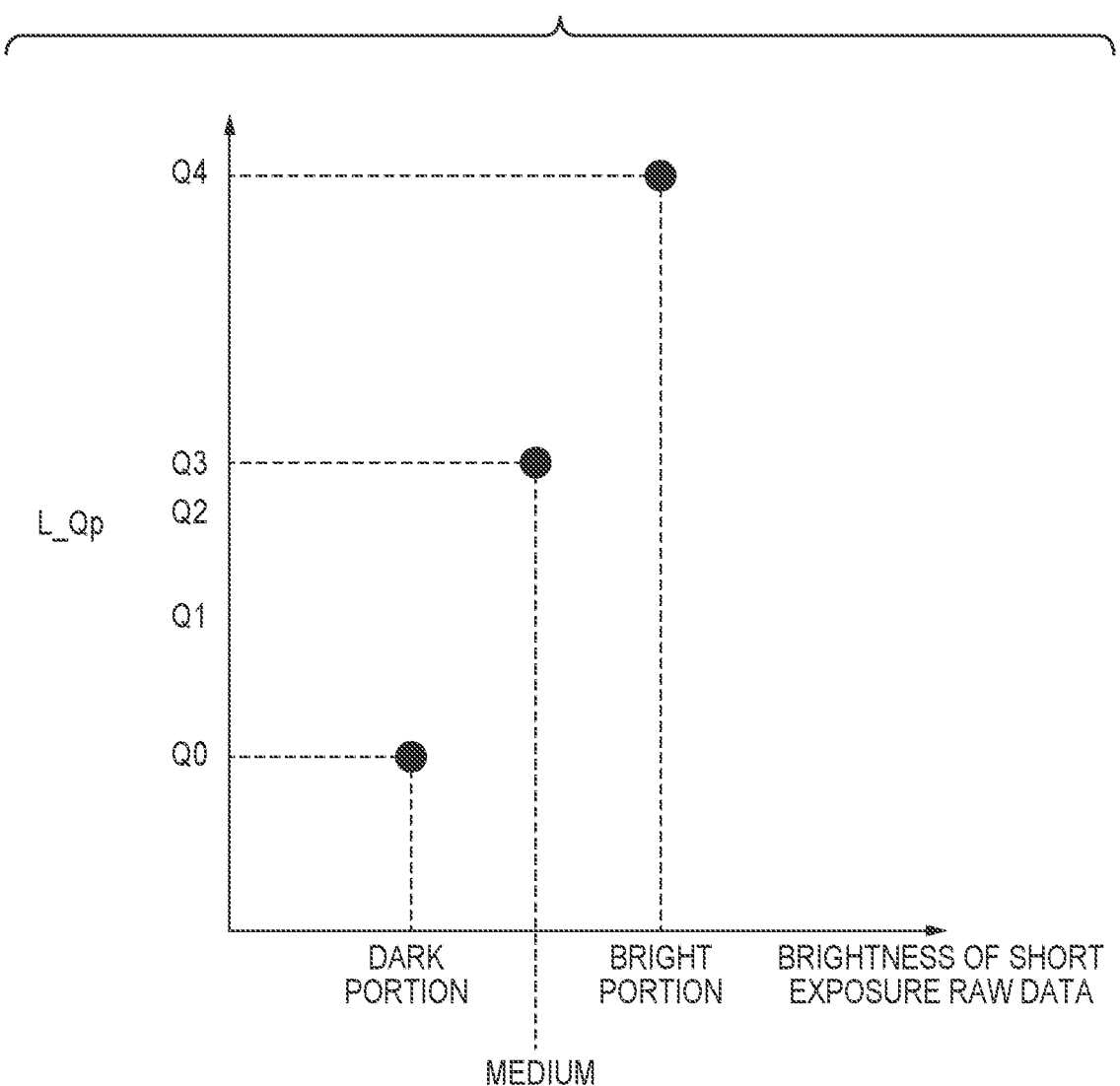
FIG. 9B is a diagram illustrating an exemplary generation of the quantization parameter.

Specific description will be given with reference to FIGS. 9A to 9C. FIG. 9A shows one exemplary setting of the quantization parameter according to the brightness of the short exposure RAW data, in the short exposure RAW data. Also, FIG. 9B shows exemplary setting of the quantization parameter according to the brightness of the short exposure RAW data, in the long exposure RAW data. Note that the brightness index may be evaluated using a 1LL subband corresponding to the quantization parameter generation unit described above. The magnitude relationship between the quantization parameters is shown in Formulas 12 to 14.

$$Q0 < Q1 < Q2 \quad \text{Formula 12}$$

$$Q1 < Q3 \quad \text{Formula 13}$$

$$Q2 < Q4 \quad \text{Formula 14}$$

First, the quantization parameters in the short exposure RAW data are set such that the quantization parameter decreases as the darkness increases, considering the visual property (Q0<Q1<Q2). In contrast, in the long exposure RAW data, the quantization parameters are set such that Q0 is set in an area corresponding to a dark portion in the short exposure RAW data so as to be the same as in the short exposure RAW data, and the quantization parameters are set in an area corresponding to medium to bright portions so as to be increased relative to the short exposure RAW data (Q1<Q3, Q2<Q4).

Figure 9C:
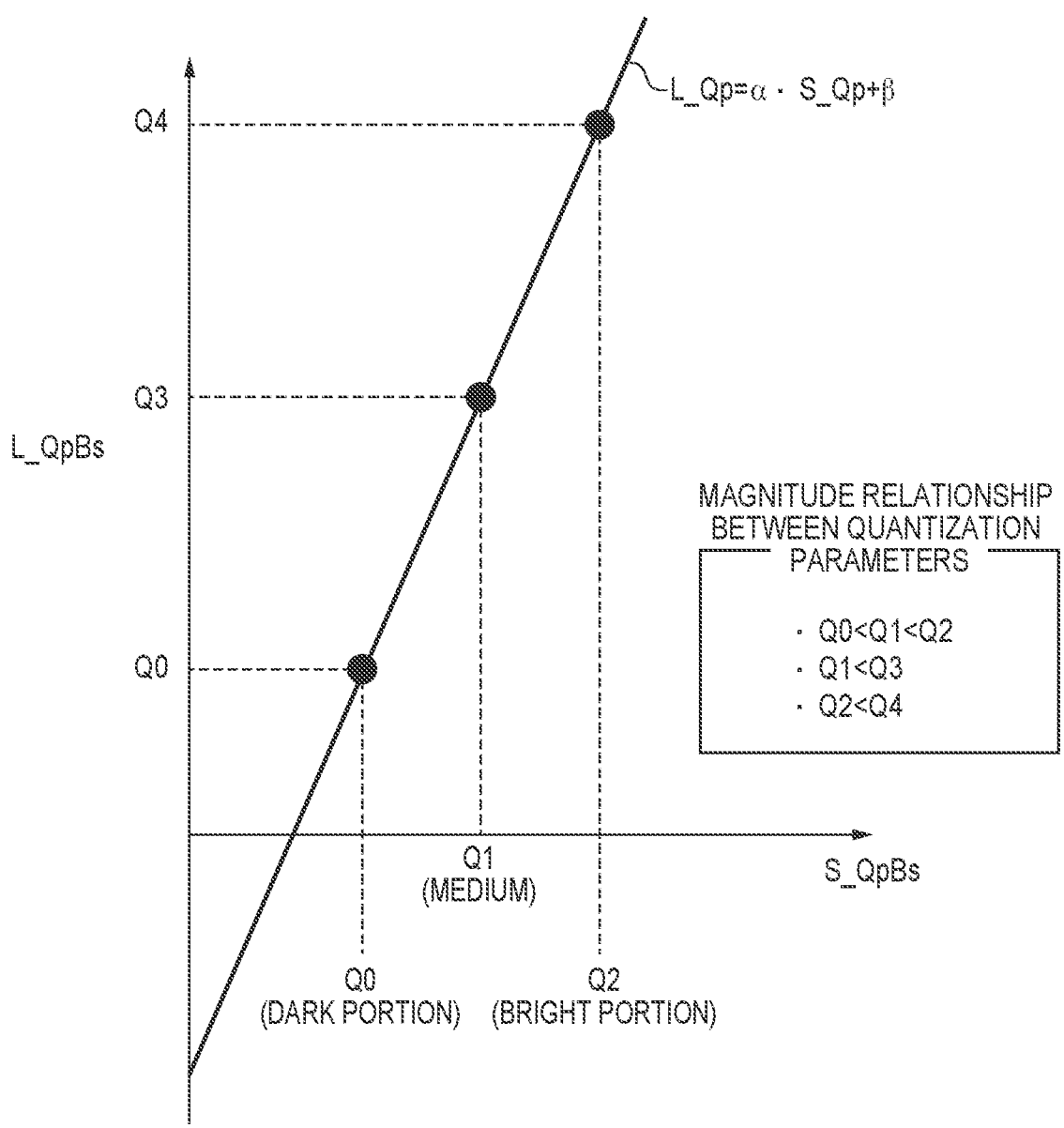
FIG. 9C is a diagram illustrating an exemplary generation of the quantization parameter.

FIG. 9C shows a graph for calculating the quantization parameters for the long exposure RAW data with the quantization parameters generated for the short exposure RAW data being the reference. The horizontal axis shows the quantization parameter (S_Qp) for the short exposure RAW data, and the vertical axis shows the quantization parameter (L_Qp) for the long exposure RAW data. α and β shown in Formula 11 may be set so as to achieve the relationship of Formulas 12 to 14.

Note that α and β are stored in the memory 107 similarly to the coded data, and is recorded in the recording medium 105 via the memory I/F 106 along with the coded data. Also, a flag indicating which of the short exposure and long exposure is of the quantization parameter to be the reference is stored in the memory 107 and is recorded in the recording medium 105 via the memory I/F 106 along with the coded data. Note that the flag may not be included when α and β are set for each exposure time while using neither of the short exposure and the long exposure as the reference.

Also, when any of the cases described above is handled, a configuration may be such that a flag indicating whether or not an exposure time to be a reference is included, and next, if the exposure time to be a reference is present, a flag indicating which of short exposure and long exposure is the reference is included. In this case as well, each flag information is stored in the memory 107, and is recorded in the recording medium 105 via the memory I/F 106 along with the coded data.

As described above, in the present embodiment, the separating unit 102 separates RAW data into pieces of data of respective exposure times, the level difference between pixels that are to be encoded is eliminated, and with this, a high frequency component is suppressed, and as a result, the recording data amount of RAW data can be reduced. Also, using a quantization parameter calculated for one RAW data as a referent, the quantization parameter for the other RAW data of the different exposure time is determined, and as a result, the recording data amount of RAW data can be reduced.

Second Embodiment

Next, a second embodiment of the disclosure will be described. In the second embodiment, the separating method of RAW data in a separating unit 102 is different from that of the first embodiment. Note that the configuration of a digital camera of the second embodiment is the same as that of the first embodiment, and therefore redundant description will be omitted, and the difference will be described.

In the first embodiment, the pieces of RAW data obtained by separating, in the separating unit 102, the pixels into groups of pixels of the same exposure time, that is, specifically, into two planes of RAW data constituted by short exposure pixels and two planes of RAW data constituted by long exposure pixels, are output to the RAW encoding unit 103.

In contrast, in the second embodiment, a method will be described in which, in order to further reduce the data amount, in the separating unit 102, pixel values of pixels of the same exposure time and of the same color component that are present in the vicinity are added, and an average pixel value is calculated and output to a RAW encoding unit 103.

The processing of the separating unit 102 in the present embodiment will be described with reference to FIGS. 10A and 10B. With respect to RAW data that is input from an image capture unit 101 and in which pixels of different exposure times are mixed, the separating unit 102 calculates an addition average of pixel values of pixels that are enclosed by each rectangle shown in FIG. 10A, that is, pixels that are short exposure pixels and of the same color component, and separates into short exposure RAW data 1001a. Specifically, as shown in the following Formulas 15 to 18, separation is made by calculating addition averages for each color component.

$$\{R(1.1)+R(2,2)\}/2=\overline{R}'(1,1) \quad \text{Formula 15}$$

$$\{G1(3.1)+G1(4,2)\}/2=\overline{G1}'(2,1) \quad \text{Formula 16}$$

$$\{G2(1.3)+G2(2,4)\}/2=\overline{G2}'(1,2) \quad \text{Formula 17}$$

$$\{B(3.3)+B(4,4)\}/2=\overline{B}'(2,2) \quad \text{Formula 18}$$

Figure 10B:
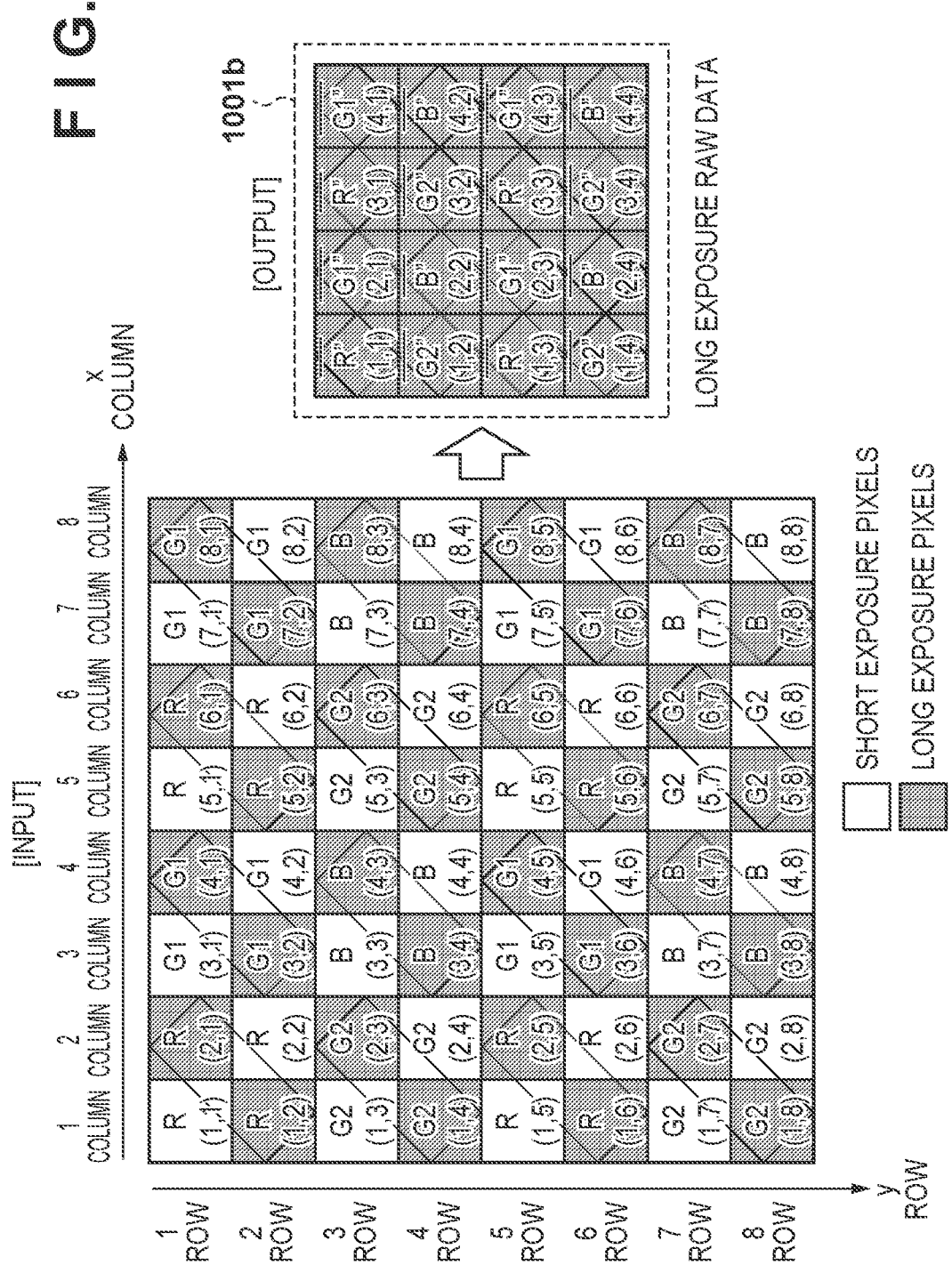

Similarly, separation into long exposure RAW data 1001b is made by calculating an addition average of pixels that are enclosed by each rectangle shown in FIG. 10B, and are long exposure pixels and of the same color component. Specifically, as shown in the following Formulas 19 to 22, separation is made by calculating addition averages for each color component.

$$\{R(2.1)+R(1,2)\}/2=\overline{R}'(1,1) \quad \text{Formula 19}$$

$$\{G1(4.1)+G1(3,2)\}/2=\overline{G1}'(2,1) \quad \text{Formula 20}$$

$$\{G2(2.3)+G2(1,4)\}/2=\overline{G2}'(1,2) \quad \text{Formula 21}$$

$$\{B(4.3)+B(3,4)\}/2=\overline{B}'(2,2) \quad \text{Formula 22}$$

As described above, in the second embodiment, the RAW data obtained by the image capture unit 101 is separated by calculating addition averages in the separating unit 102, and as a result, the data amount to be output to the RAW encoding unit 103 can be reduced to half relative to the first embodiment.

Third Embodiment

Next, a third embodiment of the disclosure will be described. In the third embodiment, the separating method of RAW data in a separating unit 102 is different from those of the first and second embodiments. Note that the configuration of a digital camera of the present embodiment is the same as those of the first and second embodiments, and therefore redundant description will be omitted, and the difference will be described.

In the second embodiment, an addition average of pixel values of pixels of the same exposure time and of the same color component that are present in the vicinity is calculated in the separating unit 102, and is output to the RAW encoding unit 103. In the third embodiment, in order to further reduce the data amount relative to the second embodiment, a gain is applied to RAW data of one exposure time in accordance with RAW data of the other exposure time, and the differences therebetween are output to a RAW encoding unit 103. That is, the RAW encoding unit 103 encodes, with respect to one exposure time, RAW data of addition averages, and encodes, with respect to the other exposure time, RAW data (difference RAW data) of difference values.

Figure 11:
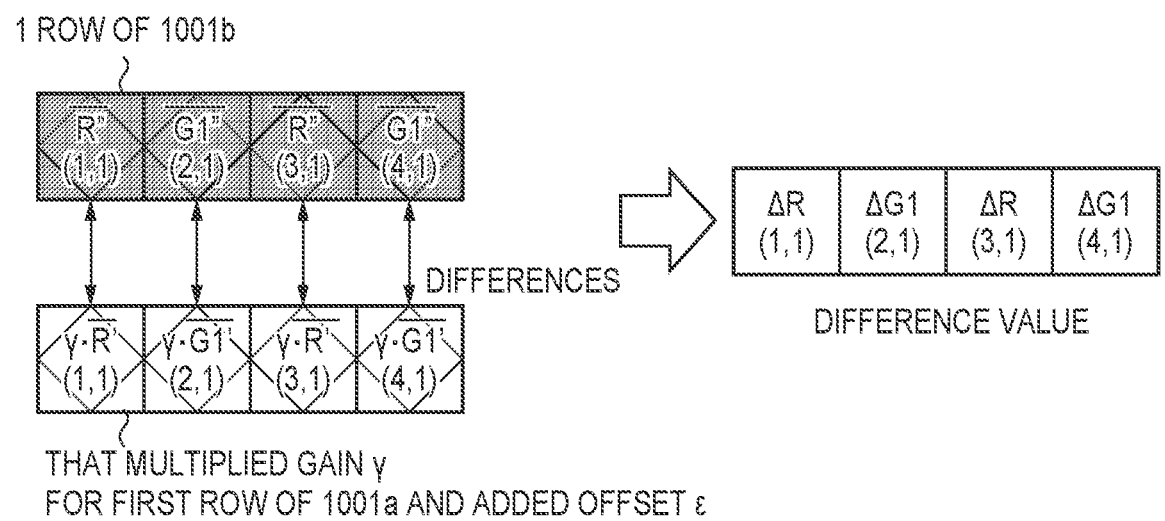
FIG. 11 is a diagram illustrating a separating method of RAW data in a third embodiment.

The processing in the separating unit 102 in the present embodiment will be described with reference to FIG. 11. First, the separating unit 102 adds pixel values of pixels of the same exposure time and of the same color component that are present in the vicinity, and obtains RAW data 1001a and 1001b by calculating the average thereof, similarly to the second embodiment, as shown in FIGS. 10A and 10B. Next, difference values between a first row in the long exposure RAW data 1001b and values obtained by multiplying a first row of the short exposure RAW data 1001a by a gain γ corresponding to the long exposure RAW data and also adding an offset ε, are obtained. Here, the gain γ and the offset ε may be determined by performing calculation backwardly from the exposure times in advance, or may be determined using a histogram of obtained pixel values of the short exposure pixels and the long exposure pixel.

Specifically, the difference in the first row is calculated as shown in the following Formulas 23 to 26.

$$\overline{R}''(1,1)-\{\gamma\overline{R}'(1,1)+\varepsilon\}=\Delta R(1,1) \quad \text{Formula 23}$$

$$\overline{G1}''(2,1)-\{\gamma\overline{G1}'(2,1)+\varepsilon\}=\Delta G1(2,1) \quad \text{Formula 24}$$

$$\overline{G2}''(3,1)-\{\gamma\overline{G2}'(3,1)+\varepsilon\}=\Delta G2(3,1) \quad \text{Formula 25}$$

$$\overline{B}''(4,1)-\{\gamma\overline{B}'(4,1)+\varepsilon\}=\Delta B(4,1) \quad \text{Formula 26}$$

This operation is similarly performed with respect to second, third, and fourth rows, in addition to the first row, and the calculated difference values are output to the RAW encoding unit 103. Note that, in the present embodiment, correction is made with respect to the short exposure RAW data, but correction may be made with respect to the long exposure RAW data. However, from the viewpoint of rounding processing, the accuracy of the difference is better when the gain γ is applied to the short exposure RAW data.

As described above, in the third embodiment, instead of outputting RAW data as is to the RAW encoding unit 103, the RAW data is output as difference values, and as a result, the recording data amount of RAW data can further be reduced relative to the second embodiment.

Fourth Embodiment

Next, a fourth embodiment of the disclosure will be described. In the fourth embodiment, a pixel array that is different from those of the first to third embodiments, that is, specifically, the pixel array shown in FIG. 12 is applied to an image capture unit 101.

In the first to third embodiments described above, the image capture unit 101 having a structure in which a minimum unit includes 4×4 16 pixels constituted by four different pixels of R, G1, G2, and B, and the minimum unit is repeatedly arranged, as shown in FIG. 2, has been described.

Figure 12:
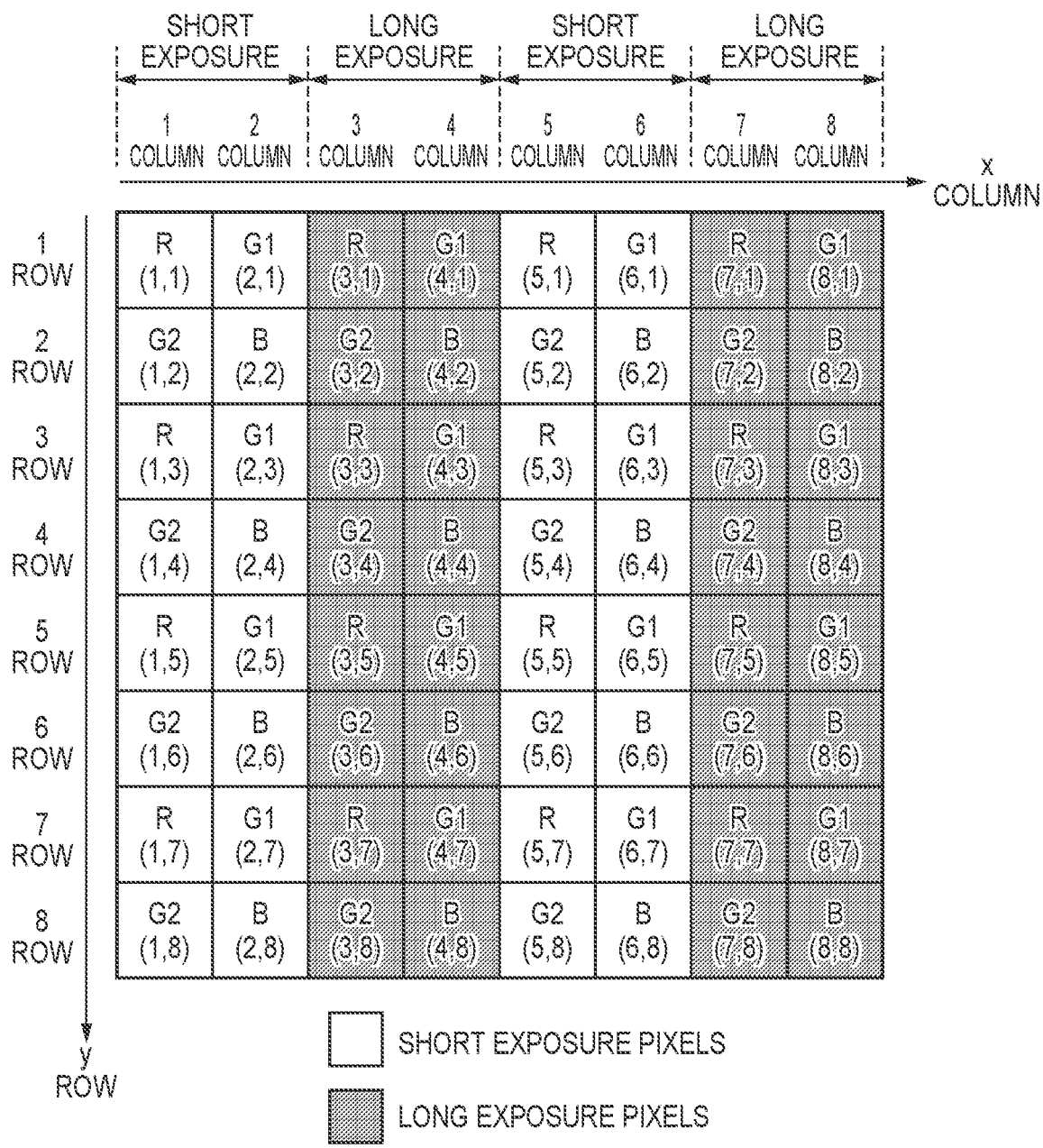
FIG. 12 is a diagram illustrating a pixel array and a setting of exposure time in a fourth embodiment

In contrast, FIG. 12 shows a pixel array and the setting of the exposure time of the image capture unit 101 in the fourth embodiment. The horizontal direction is denoted by x, the vertical direction is denoted by y, the column number is represented by an x coordinate, and the row number is represented by a y coordinate. The numbers with parentheses indicate the coordinates indicating the position of each pixel on the image sensor. Also, white pixels represent short exposure pixels, and gray pixels represent long exposure pixels. In this way, in FIG. 12, in a pixel array of a Bayer arrangement constituted by an array of R, G1, G2, and B pixels, short exposure pixels and long exposure pixels are alternatingly set in units of two columns.

Figure 13:
FIG. 13 is a diagram illustrating rearrangement of a pixel array in a fourth embodiment.

In the pixel array and the exposure time setting in FIG. 12 as well, as a result of performing processing while performing rearrangement to the pixel arrangement structure shown in FIG. 2, as shown in FIG. 13, the processing described in the first to third embodiments can be performed.

As described above, in the fourth embodiment, processing similar to the processing described in the first to third embodiments can be performed even if the pixel array is changed.

Fifth Embodiment

Figure 14:
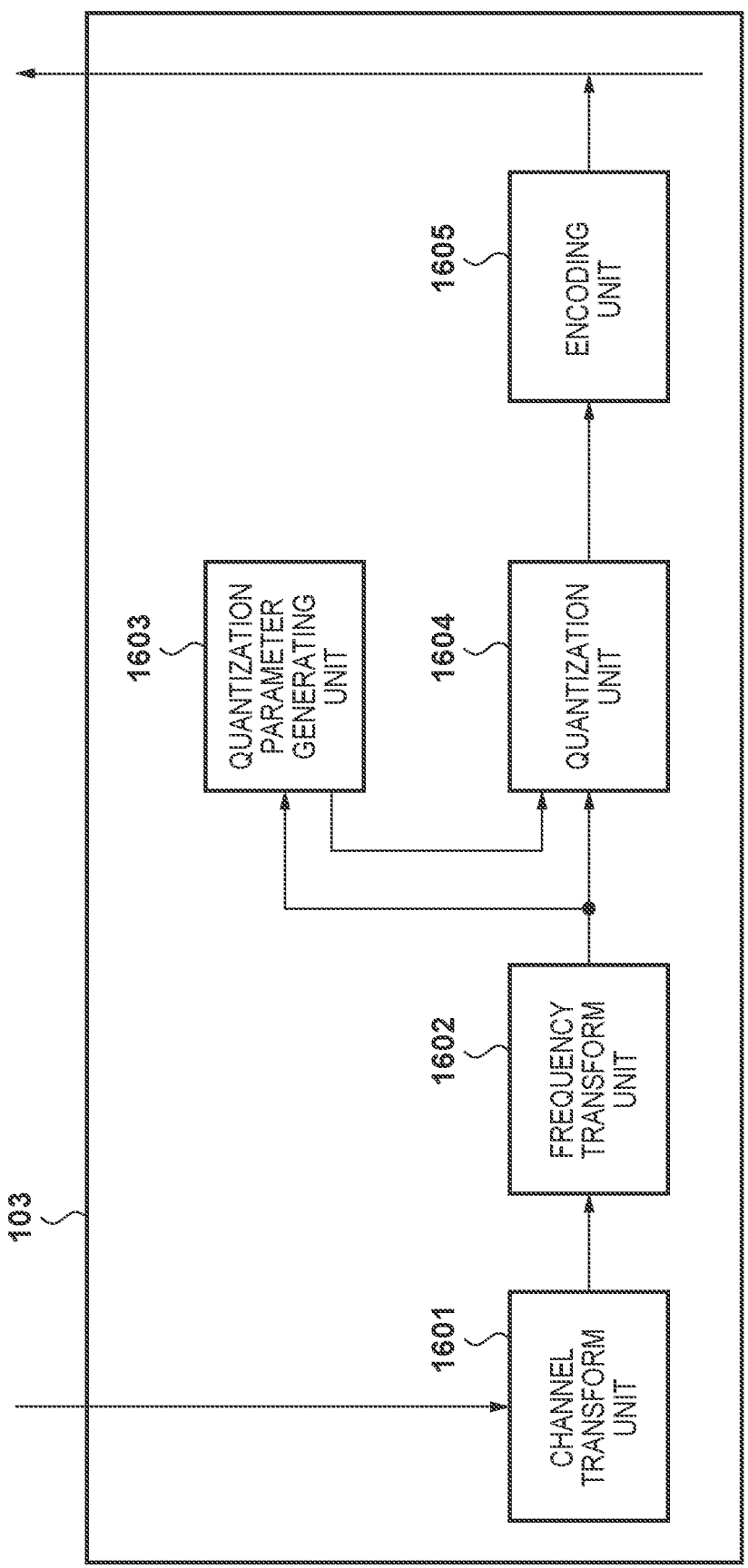
FIG. 14 is a block diagram illustrating a configuration of a RAW encoding unit in a fifth embodiment.

Next, the detailed configuration of a RAW data encoding unit 103 that performs encoding processing of short exposure RAW data 401a and 401b and long exposure RAW data 401c and 401d and the processing flow in the fifth embodiment will be described with reference to the block diagram shown in FIG. 14. Note that the configurations shown in FIGS. 1 to 5 are similar to those of the first embodiment.

A RAW data encoding unit 103 mainly includes a channel transform unit 1601, a frequency transform unit 1602, a quantization parameter generating unit 1603, a quantization unit 1604, and an encoding unit 1605.

The channel transform unit 1601 transforms RAW data configured as in the Bayer arrangement that is input from a separating unit 102 into a plurality of channels. Here, transformation is performed into four channels separately for R, G1, G2, and B of the Bayer arrangement.

The frequency transform unit 1602 performs frequency transform processing by discrete wavelet transform at a predetermined resolution level (hereinafter, denoted as "lev") for each channel, and outputs generated subband data (transform coefficient) to the quantization parameter generating unit 1603 and the quantization unit 1604.

FIG. 15A shows a filter bank configuration for realizing the discrete wavelet transform regarding the subband division processing at lev=1. When the discrete wavelet transform processing is executed in the horizontal and vertical directions, division into one low frequency subband (LL) and three high frequency subbands (HL, LH, HH) is performed, as shown in FIG. 15B.

The transfer functions of the low pass filter (hereinafter, denoted as "lpf") and the high pass filter (hereinafter, denoted as "hpf") shown in FIG. 15A are respectively shown in Formulas 27 and 28.

$$\text{lpf}(Z)=(-Z^{-2}+2Z^{-1}+6+2Z^1-Z^2)/8 \quad \text{Formula 27}$$

$$\text{hpf}(Z)=(-Z^{-1}+2-Z^1)/2 \quad \text{Formula 28}$$

When lev is larger than 1, subband division is hierarchically executed with respect to the low frequency subband (LL). Note that, here, the discrete wavelet transform is configured by a five tap lpf and a three tap hpf, as shown in Formulas 27 and 28, but there is no limitation thereto, and a filter configuration in which the number of taps and the coefficients are different may be adopted.

The quantization parameter generating unit 1603 calculates, with respect to subband data (transform coefficient) generated by the frequency transform unit 1602, a brightness feature amount in units of predetermined coefficients (square block of one coefficient or more, square area of one pixel or more), and generates a quantization parameter according to the feature amount. Quantization is similarly performed in units of predetermined coefficients (square block of one coefficient or more), but it may be desirable to be the same as the unit of calculating the feature amount, considering the controllability of the image quality. The method of setting the quantization parameter according to the brightness and the flow of generating the quantization parameter will be described later in detail. Then, the generated quantization parameters are output to the quantization unit 1604.

The quantization unit 1604 performs quantization processing on the subband data (transform coefficient) input from the frequency transform unit 1602 using the quantization parameters supplied from the quantization parameter generating unit 1603, and outputs the quantized subband data (transform coefficient) to the encoding unit 1605.

The encoding unit 1605 performs predictive difference entropy coding of the quantized subband data (transform coefficient) input from the quantization unit 1604 for each subband in a raster scan order, and stores the generated encoded RAW data to a memory 107. Note that other methods may be used as the prediction method and the entropy coding method.

Figure 16:
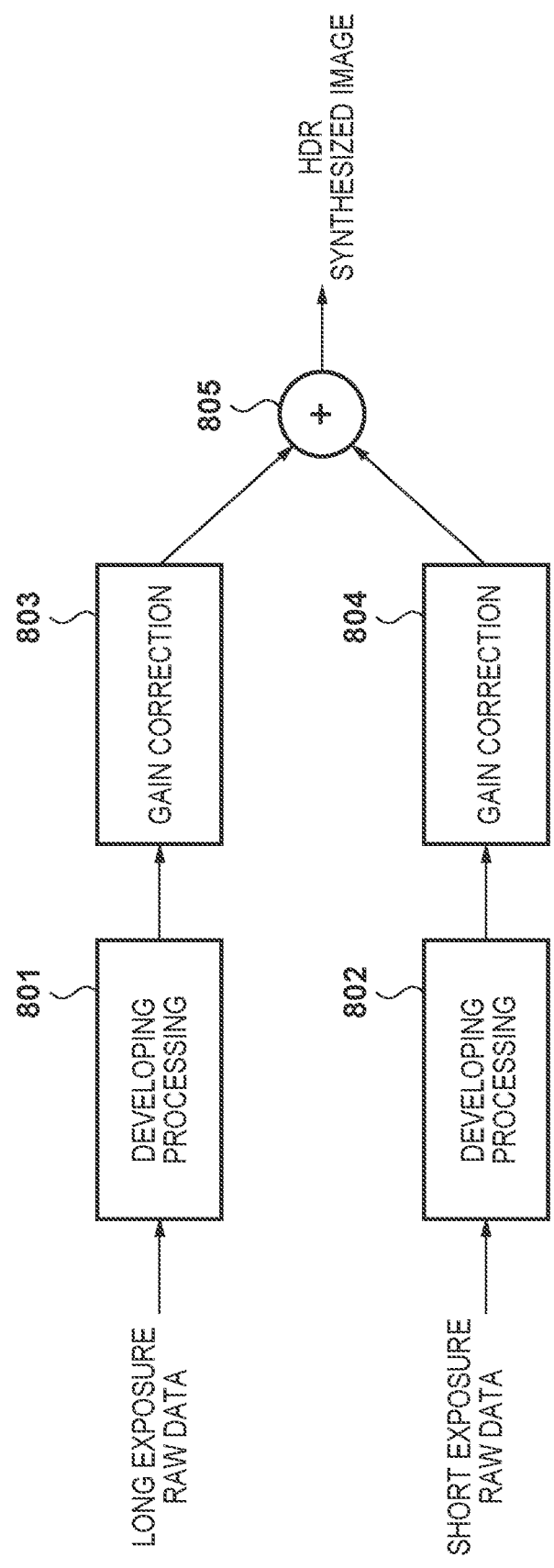
FIG. 16 is a processing block diagram for describing HDR synthesizing processing.

Here, the HDR (high dynamic range) synthesizing processing method will be described using FIG. 16. FIG. 9 is a processing block diagram for performing HDR synthesizing. A digital camera 100 is configured so as to record two sheets of RAW data that are different in exposure amount, and therefore description is given assuming that the HDR synthesizing processing in the present embodiment performs HDR synthesizing on two sheets of RAW data. Note that one of the sheets of exposure RAW data is RAW data obtained by capturing performed at correct exposure. The other is RAW data obtained at an exposure time that causes overexposure or underexposure, which is auxiliary data for DR expansion.

A developing processing unit 801 performs developing processing on long exposure RAW data. Then, the generated developed long exposure image is output to a gain correction unit 803. A developing processing unit 802 performs developing processing on short exposure RAW data. Then, the generated developed short exposure image is output to a gain correction unit 804.

A gain correction unit 803 performs gain correction on the long exposure image using a gain value based on a predetermined synthesizing ratio. The synthesizing ratio will be described later. A gain correction unit 804 performs gain correction on the short exposure image using a gain value based on the predetermined synthesizing ratio. The synthesizing ratio will be described later. An addition processing unit 805 performs addition processing of pixels at the same coordinate position, with respect to the long exposure image and the short exposure image.

In this way, in the HDR synthesizing processing, the gain correction processing and the addition processing are performed on images generated by performing developing processing on two sheets of RAW data that are different in exposure amount. Note that this HDR synthesizing processing is similarly performed on each color component (R, G, B) that constitutes image data. Also, the developing processing includes debayering processing, luminance color difference transform processing, noise removal processing, optical distortion correction processing, and the like.

Next the synthesizing ratio between the short exposure image data and the long exposure image data will be described. The way of thinking of the synthesizing ratio differs based on which piece of exposure image data is image data of correct exposure. The case where long exposure image data is of correct exposure and the case where short exposure image data is of correct exposure will be separately described.

First, the synthesizing ratio in the case of the long exposure image data being of correct exposure will be described. When the long exposure image data is obtained by capturing performed at correct exposure, the exposure time of the short exposure image data is relatively shorter than that of the long exposure image data, and therefore the short exposure image data is of underexposure.

An example of the histogram of image data when capturing is performed at this exposure condition is shown in FIG. 17A. The histogram shown in FIG. 17A is a histogram of a specific color component that constitutes the image data. The horizontal axis of the histogram shows a pixel value indicating the brightness of image data, and the vertical axis shows the number of pixels. Also, Ta and Tb represent pixel threshold values, and Tc represents pixel upper limit value. It is defined that an area that satisfies the condition of pixel value≤Ta is called as a dark portion, an area that satisfies the condition of Ta<pixel value≤Tb is called as an intermediate portion, and an area that satisfies the condition of Tb<pixel value is called as a bright portion. In this histogram, the long exposure image data correctly expresses the tone in the dark portion area and the intermediate portion area, but in the bright portion area, many pixels are present in an area at Tc and more, Tc being the pixel upper limit, and therefore the long exposure image data is in a state in which tone information is lost due to the occurrence of blown out highlights. In the HDR synthesizing processing, in order to expand the tone range in which blown out highlights has occurred, the short exposure image data at the same coordinate positions is synthesized. In the HDR synthesizing processing in this exposure condition, addition processing is performed by performing gain correction such that the synthesizing ratio of the long exposure image data is large in the dark portion area and the intermediate portion area at which DR can be secured at correct exposure, and the synthesizing ratio of the short exposure image data increases in the bright portion area at which DR is difficult to be secured at correct exposure.

An example of the synthesizing ratio is shown in FIG. 17B. The horizontal axis shows the pixel value of the long exposure image data (correct exposure), and the vertical axis shows the synthesizing ratio. The graph in FIG. 17B shows the synthesizing ratios of the pieces of exposure image data according to the pixel value, and the synthesizing ratios of the pieces of exposure image data change such that the sum thereof is constantly 100%. As described in FIG. 17A, because the bright portion includes many pixels at which blown out highlights has occurred, in the graph in FIG. 17B, the synthesizing ratio of the long exposure image data decreases, from the pixel value at the threshold value Tb, to 0% at the pixel upper limit value Tc, and the synthesizing ratio of the short exposure image data increases, from the pixel value at the threshold value Tb, to 100% at the pixel upper limit value Tc. As a result of using such synthesizing ratios, it is possible to expand DR in the synthesized image while reducing the influence of blown out highlights. Note that an example has been described in which the synthesizing ratios change with the threshold value Tb being the boundary in order to make the description easier to understand, but the synthesizing ratios of the pieces of exposure image data are not limited thereto.

Based on the above description, the magnitude relationship between synthesizing ratios of the long exposure image data and the short exposure image data is shown in FIG. 17C. A0 in the diagram represents the synthesizing ratio in a dark portion of the long exposure pixel, A1 represent the synthesizing ratio in an intermediate portion of the long exposure pixel, A2 represent the synthesizing ratio in a bright portion of the long exposure pixel. Also, A3 in the diagram represents the synthesizing ratio in a dark portion of the short exposure pixel, A4 represent the synthesizing ratio in an intermediate portion of the short exposure pixel, A5 represent the synthesizing ratio in a bright portion of the short exposure pixel. The magnitude relationships between the synthesizing ratios for the respective brightness areas are A0>A3 in the dark portion, A1>A4 in the intermediate portion, and A2<A5 in the bright portion.

Next, the synthesizing ratios in the case of the short exposure image data being of correct exposure will be described. When the short exposure image data is obtained by capturing performed at correct exposure, the exposure time of the long exposure image data is relatively longer than that of the short exposure image data, and therefore the long exposure image data is of overexposure.

An example of the histogram of image data when capturing is performed at this exposure condition is shown in FIG. 18A. The histogram shown in FIG. 18A is a histogram of a specific color component that constitutes the image data. The horizontal axis of the histogram shows a pixel value indicating the brightness of image data, and the vertical axis shows the number of pixels. Also, Ta and Tb represent pixel threshold values, and Td represents pixel lower limit value. It is defined that an area that satisfies the condition of pixel value≤Ta is called as a dark portion, an area that satisfies the condition of Ta<pixel value≤Tb is called as an intermediate portion, and an area that satisfies the condition of Tb<pixel value is called as a bright portion. In this histogram, the short exposure image data correctly expresses the tone in the intermediate portion area and the bright portion area, but in the dark portion area, many pixels are present in an area at Td and less, Td being the pixel lower limit, and therefore the short exposure image data is in a state in which tone information is lost due to the occurrence of blocked up shadows. In the HDR synthesizing processing, in order to expand the tone range at which blocked up shadows has occurred, the long exposure image data at the same coordinate positions is synthesized. In the HDR synthesizing processing in this exposure condition, addition processing is performed by performing gain correction such that the synthesizing ratio of the short exposure image data is large in the intermediate portion area and the bright portion area at which DR can be secured at correct exposure, and the synthesizing ratio of the long exposure image data increases in the dark portion area at which DR is difficult to be secured at correct exposure.

Next, an example of the synthesizing ratio is shown in FIG. 18B. The horizontal axis shows the pixel value of the short exposure image data (correct exposure), and the vertical axis shows the synthesizing ratio. The graph in FIG. 18B shows the synthesizing ratios of the pieces of exposure image data according to the pixel value, and the synthesizing ratios of the pieces of exposure image data change such that the sum thereof is constantly 100%. As described in FIG. 18A, because the dark portion includes many pixels at which blocked up shadows has occurred, in the graph in FIG. 18B, the synthesizing ratio of the long exposure image data is changed so as to be 100% at the pixel lower limit value Td, and the synthesizing ratio of the short exposure image data is changed so as to be 0% at the pixel lower limit value Td. As a result of using such synthesizing ratios, it is possible to expand DR in the synthesized image while reducing the influence of blown out highlights. Note that an example has been described in which the synthesizing ratios change with the threshold value Ta being the boundary in order to make the description easier to understand, but the synthesizing ratios of the pieces of exposure image data are not limited thereto.

Based on the above description, the magnitude relationship between synthesizing ratios of the long exposure image data and the short exposure image data is shown in FIG. 18C. B0 in the diagram represents the synthesizing ratio in a dark portion of the short exposure pixel, B1 represent the synthesizing ratio in an intermediate portion of the short exposure pixel, B2 represent the synthesizing ratio in a bright portion of the short exposure pixel. Also, B3 in the diagram represents the synthesizing ratio in a dark portion of the long exposure pixel, B4 represent the synthesizing ratio in an intermediate portion of the long exposure pixel, B5 represent the synthesizing ratio in a bright portion of the long exposure pixel. The magnitude relationships between the synthesizing ratios for the respective brightness areas are B0<B3 in the dark portion, B1>B4 in the intermediate portion, and B2>B5 in the bright portion.

As described above, in the HDR synthesizing processing, the synthesizing ratios of the pieces of exposure image data change in accordance with whether or not being of correct exposure and the size of pixel value (brightness). The size of synthesizing ratio indicates a degree of influence on the image quality, and in the area in which the synthesizing ratio is large, the influence on the image quality is large, and in the area in which the synthesizing ratio is smaller, the influence on the image quality is smaller. Therefore, with respect to RAW data to be compression-recorded, the code amount is to be most suitably distributed in accordance with the degree of influence on the image quality based on the synthesizing ratio in the HDR synthesizing processing. That is, it is important to set the quantization parameters such that the image quality is secured by assigning a larger amount of code to an area in which the synthesizing ratio is larger, and the code amount is reduced regarding an area in which the synthesizing ratio is small and the influence on the image quality is small.

Next, basic way of thinking in the quantization parameter generation performed by the quantization parameter generating unit 1603 will be described. As described above, it is assumed that the weighting of the quantization parameter is performed according to the synthesizing ratio obtained by envisioning the HDR synthesizing processing. The way of thinking of weighting of the quantization parameter according to the brightness considering the visual property of an image is added thereto.

The RAW data is subjected to adjustment of the luminance level such as gamma correction processing and tone curve correction processing, in the post processing after development. When a dark portion in which the original luminance level is small is compared with a bright portion in which the original luminance level is large, even if adjustment is performed to the same luminance level, the change ratio of the pixel value is larger in the dark portion. If the quantization processing is performed with the same quantization parameter with respect to the dark portion and the bright portion, the change ratio of the pixel value is larger in the dark portion, and therefore the quantization error due to the quantization processing is amplified, and the image quality degradation becomes apparent. On the other hand, in the bright portion in which the change ratio of the luminance level is small, the change ratio of the pixel value is also small, and as a result, the amplification degree of the quantization error is small, and the image quality degradation is not apparent. Quantization of the RAW data is to be performed considering the quantization error amplified by the post processing in order to ensure the image quality after the post processing. Also, in the dark portion, contrast is small relative to that in the bright portion, and the signal level of subband data is small. Therefore, if coarse quantization is performed regarding the dark portion, the subband data after quantization is likely to be 0. Once the coefficient becomes 0, the signal cannot be restored in the inverse quantization process, and apparent image quality degradation occurs.

With these reasons, control is performed such that the quantization parameter decreases in the dark portion area in which the image quality degradation is likely to be apparent, and the quantization parameter increases in the bright portion area in which the image quality degradation is not likely to be apparent. In the present embodiment, a configuration will be described in which quantization tables in which the quantization parameters for the respective subbands are compiled are prepared in advance, and the quantization table to be referred to is switched in accordance with the synthesizing ratio and the brightness feature amount. These quantization tables are constituted by quantization parameters for respective pieces of subband data according to lev. The quantization parameters for each subband are set such that the quantization parameter is smaller in the lower subband in which image quality degradation is likely to be apparent. If lev=1, the magnitude relationship between the quantization parameters of the respective subbands is 1LL<1HL=1LH<1HH.

Based on the way of thinking of weighting of the quantization parameters in accordance with brightness, exemplary setting of quantization tables for pieces of RAW data obtained by capturing at the respective exposure times will be described, regarding following three conditions separately. Note that, in the present embodiment, an example will be described in which the brightness feature amount is classified into three feature areas of dark portion, intermediate portion, and bright portion. Note that the definition of the features to be classified is similar to those in the histograms in FIGS. 17 and 18.

[Exposure Time is the Same Between Short Exposure RAW Data and Long Exposure RAW Data]

In this condition, one piece of RAW data is generated by calculating a pixel average for each adjacent four pixels of the same color component (refer to FIG. 5). One piece of RAW data is to be quantized, and because the HDR synthesizing processing will not be performed, brightness feature classification is performed using the RAW data generated by calculating pixel averages, and quantization is performed using a quantization table according to the classification result. An exemplary setting of the quantization table is shown in FIG. 19A. Q0 indicates a quantization table for assuring the image quality in the dark portion, Q1 indicates a quantization table for assuring the image quality in the intermediate portion, and Q2 indicates a quantization table for assuring the image quality in the bright portion. The magnitude relationship between the quantization tables is as follows.

$Q0<Q1<Q2$

In this way, a quantization table according to the brightness based on the visual property is set.

[When Exposure Time is Different Between Short Exposure RAW Data and Long Exposure RAW Data, and Short Exposure RAW Data is of Correct Exposure]

In this condition, the image data is separated into short exposure RAW data and long exposure RAW data (refer to FIGS. 4A to 4D). An exemplary setting of quantization tables is shown in FIG. 19B. Because blocked up shadows is likely to occur in the short exposure RAW data obtained by capturing performed at correct exposure, DR in the dark portion is expanded using the long exposure RAW data obtained by capturing performed in the condition of overexposure. The quantization tables indicated by Q1 and Q2 in the diagram are similar to those in FIG. 19A. Here, two quantization tables indicated by Q3 and Q4 are newly added. Q3 indicates a table aiming at suppressing generated code amount assuming that the area is an area in which the synthesizing ratio in the HDR synthesizing processing is small, and the influence on the image quality is small. Q4 indicates a quantization table aiming at assigning a large amount of code in order to expand DR in the dark portion in which blocked up shadows is likely to occur in the HDR synthesizing processing. The magnitude relationship between the quantization tables are as follows.

$Q0 \le Q4<Q1<Q2<Q3$ or, $Q0<Q4 \le Q1<Q2<Q3$

The quantization parameter in Q4 is greater than or equal to the quantization parameter in Q0, and is smaller than the quantization parameter in Q2. In this way, it becomes possible to ensure the image quality after HDR synthesizing processing by setting a quantization table in which the quantization parameter is relatively small with respect to a dark portion in the long exposure RAW data regarding which the synthesizing ratio is large, in addition to quantization tables according to brightness based on the visual property. On the other hand, as a result of setting a quantization table in which the quantization parameter is large with respect to a dark portion in the short exposure RAW data regarding which the synthesizing ratio is small and to an intermediate portion and a bright portion in the long exposure RAW data, the data amount can be effectively reduced without dropping the image quality after HDR synthesizing processing.

[When Exposure Time is Different Between Short Exposure RAW Data and Long Exposure RAW Data, and Long Exposure RAW Data is of Correct Exposure]

In this condition as well, the image data is separated into RAW data constituted by short exposure pixels and RAW data constituted by long exposure pixels (refer to FIGS. 4A to 4D). An exemplary setting of the quantization table is shown in FIG. 19C. As described above, blown out highlights is likely to occur in long exposure pixels for capturing at correct exposure, and DR in the bright portion is expanded using short exposure pixels for capturing at underexposure. The quantization tables indicated by Q0, Q1, and Q3 are similar to those in FIGS. 19A and 19B. Here, a quantization table indicated by Q5 is newly added. Q5 indicates a quantization table aiming at assigning a large amount of codes for expanding DR in the bright portion in which blown out highlights is likely to occur in the HDR synthesizing processing. The magnitude relationship between the quantization tables is as follows.

$Q0<Q1 \le Q5<Q2<Q3$ or, $Q0<Q1<Q5 \le Q2<Q3$

The quantization parameter in Q5 is less than or equal to the quantization parameter in Q2, and is larger than the quantization parameter in Q0. It becomes possible to ensure the image quality after HDR synthesizing processing by setting a quantization table in which the quantization parameter is relatively small regarding a bright portion in the short exposure RAW data in which the synthesizing ratio is large, in addition to quantization tables according to brightness based on the visual property, in this way. On the other hand, as a result of setting quantization tables in which the quantization parameter is large regarding a bright portion in the long exposure RAW in which the synthesizing ratio is small and a dark portion and an intermediate portion in the short exposure RAW data, the data amount can be effectively reduced without dropping the image quality after HDR synthesizing processing.

Next, the quantization processing procedure will be described using the flowcharts shown in FIGS. 20A-20C. In the present embodiment, it is assumed that lev=1 in order to make the description easier to understand, and the brightness feature amount is calculated using subband data that constitutes RAW data obtained by capturing at an exposure time that is to be correct exposure.

Calculation of the brightness feature amount and the quantization processing are assumed to be performed in units of one coefficient, and the operation is performed so as to uniquely determine the quantization tables to be applied to respective pieces of RAW data of different exposure times, according to the brightness feature amounts for the respective coefficients (refer to FIG. 19 for the details).

In the present embodiment, the operation mode in which capturing is performed while changing the exposure time for each pixel is called as an HDR mode, and the operation mode in which capturing is performed without changing the exposure time is called as a normal mode. As described above, in the HDR mode, the horizontal size and the vertical size of RAW data to be recorded is doubled relative to the normal mode (refer to FIGS. 4A to 5), and therefore the amount of data to be subjected to quantization processing differs between the modes.

In step S1201, the controller 108 determines whether or not the operation mode of the digital camera 100 is the HDR mode. If it is determined to be the HDR mode, the processing is advanced to step S1202, and if not, the processing is advanced to step S1219.

In step S1202, the controller 108 determines whether or not the short exposure RAW data is of correct exposure. If the short exposure RAW data is of correct exposure, the processing is advanced to step S1203, and if not, the processing is advanced to step S1211.

In step S1203, the controller 108 calculates the brightness feature amount using the short exposure subband data that is of correct exposure. The size of the coefficient of a 1LL subband of the G1 (green) component is used as the brightness feature amount. It is because the LL subband is a DC component, and therefore can represent the brightness, and the reason why the G1 component is used is because the human visual property is sensitive in the change in G component, and the G1 component is important visual information.

In step S1204, the controller 108 determines whether or not the area of interest is a dark portion based on the magnitude relationship between the brightness feature amount calculated in step S1203 and predetermined threshold values. If it is determined to be a dark portion, the processing is advanced to step S1205, and if not, the processing is advanced to step S1206.

In step S1205, the controller 108 determines that the quantization table for the pieces of color component subband data that constitute the short exposure RAW data is Q3, and determines that the quantization table for the pieces of color component subband data that constitute the long exposure RAW data is Q4, and executes the quantization processing.

In step S1206, the controller 108 determines whether or not the area of interest is an intermediate portion based on the magnitude relationship between the brightness feature amount calculated in step S1203 and the predetermined threshold values. If it is determined to be an intermediate portion, the processing is advanced to step S1207, and if not, the processing is advanced to step S1208.

In step S1207, it is determined that the quantization table for the pieces of color component subband data that constitute the short exposure RAW data is Q1, and the quantization table for the pieces of color component subband data that constitute the long exposure RAW data is Q3, and executes the quantization processing.

In step S1208, the controller 108 determines that the quantization table for the pieces of color component subband data that constitute the short exposure RAW data is Q2, and the quantization table for the pieces of color component subband data that constitute the long exposure RAW data is Q3, and executes the quantization processing.

In step S1209, the controller 108 determines whether or not the quantization processing is completed with respect to all pieces of subband data in the image plane. If the quantization processing is completed with respect to all pieces of subband data, the processing is ended, and if not, the processing is advanced to step S1210.

In step S1210, the controller 108 updates the quantization processing target coefficient. The controller 108, upon completing updating of the coefficient, returns the processing to step S1203.

In step S1211, the controller 108 calculates the brightness feature amount using the long exposure subband data that is of correct exposure. The size of the coefficient of the 1LL subband of the G1 component is used as the brightness feature amount, similarly to step S1203.

In step S1212, the controller 108 determines whether or not the area of interest is a dark portion based on the magnitude relationship between the brightness feature amount calculated in step S1211 and predetermined threshold values. If it is determined to be a dark portion, the processing is advanced to step S1213, and if not, the processing is advanced to step S1214.

In step S1213, the quantization table for the pieces of color component subband data that constitute the short exposure RAW data is determined to Q3, and the quantization table for the pieces of color component subband data that constitute the long exposure RAW data is determined to Q0, and the quantization processing is executed.

In step S1214, the controller 108 determines whether or not the area of interest is an intermediate portion based on the magnitude relationship between the brightness feature amount calculated in step S1211 and the predetermined threshold values. If it is determined to be an intermediate portion, the processing is advanced to step S1215, and if not, the processing is advanced to step S1216.

In step S1215, the controller 108 determines that the quantization table for the pieces of color component subband data that constitute the short exposure RAW data is Q3, and the quantization table for the pieces of color component subband data that constitute the long exposure RAW data is Q1, and executes the quantization processing.

In step S1216, the controller 108 determines that the quantization table for the pieces of color component subband data that constitute the short exposure RAW data is Q5, and the quantization table for the pieces of color component subband data that constitute the long exposure RAW data is Q3, and executes the quantization processing.

In step S1217, the controller 108 determines whether or not the quantization processing is completed with respect to all pieces of subband data in the image plane. If the quantization processing is completed with respect to all pieces of subband data, the processing is ended, and if not, the processing is advanced to step S1218.

In step S1218, the controller 108 updates the quantization processing target coefficient. The controller 108, upon completing updating of the coefficient, returns the processing to step S1211.

In step S1219, because the normal mode is determined, the controller 108 calculates the brightness feature amount using the subband data obtained by performing frequency transform on RAW data generated by performing addition average. The size of the coefficient of a 1LL subband of the G1 component that is obtained by performing addition average is used as the brightness feature amount, similarly to step S1203.

In step S1220, the controller 108 determines whether or not the area of interest is a dark portion based on the magnitude relationship between the brightness feature amount calculated in step S1219 and predetermined threshold values. If it is determined to be a dark portion, the processing is advanced to step S1221, and if not, the processing is advanced to step S1222.

In step S1221, the controller 108 determines that the quantization table for the pieces of color component subband data that constitute the RAW data is Q0, and executes the quantization processing.

In step S1222, the controller 108 determines whether or not the area of interest is an intermediate portion based on the magnitude relationship between the brightness feature amount calculated in step S1219 and the predetermined threshold values. If it is determined to be an intermediate portion, the processing is advanced to step S1223, and if not, the processing is advanced to step S1224.

In step S1223, the controller 108 determines that the quantization table for the pieces of color component subband data that constitute the RAW data is Q1, and executes the quantization processing.

In step S1224, the controller 108 determines that the quantization table for the pieces of color component subband data that constitute the RAW data is Q2, and executes the quantization processing.

In step S1225, the controller 108 determines whether or not the quantization processing is completed with respect to all pieces of subband data in the image plane. If the quantization processing is completed with respect to all pieces of subband data, the processing is ended, and if not, the processing is advanced to step S1226.

In step S1226, the controller 108 updates the quantization processing target coefficient. The controller 108, upon completing updating of the coefficient, returns the processing to step S1219.

As described above, in the present embodiment, the separating unit 102 separates RAW data into pieces of data of respective exposure times, the level difference between pixels that are different in the exposure time is eliminated, and with this, a high frequency component is suppressed, and as a result, the recording data amount of RAW data can be reduced. Also, as a result of performing weighting of quantization parameters considering the synthesizing ratio while envisioning the HDR synthesizing processing after developing processing, the recording data amount of the RAW data can be effectively reduced.

Note that, in the present embodiment, an example in which the brightness feature is classified into three stages has been described, but the number of stages into which classification is performed is not limited thereto, and the number of stages may further be increased. Also, in the flowcharts shown in FIGS. 20A-20C, a configuration has been described in which, based on the feature amount calculated using the 1LL subband data of the G1 component, quantization tables for pieces of subband data of the other color components are uniquely determined. However, the operation may be performed such that the quantization table is determined by independently calculating the feature amount with respect to each color component.

Also, an example has been described in which the calculation unit of the feature amount and the processing unit of quantization are each one coefficient, but the processing unit may be a coefficient block (two coefficients or more).

Figure 20A:
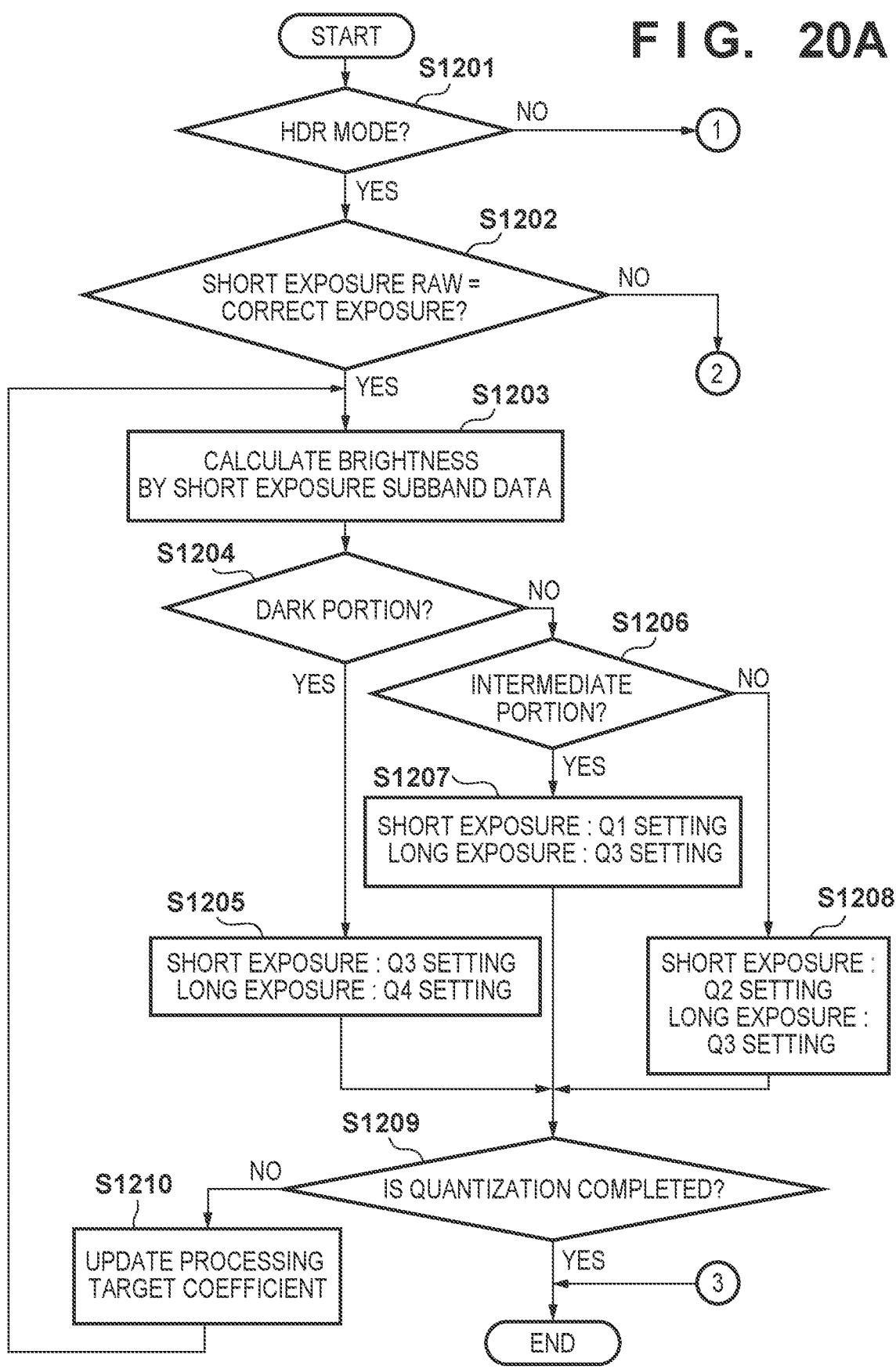
FIGS. 20A to 20C are flowcharts illustrating a quantization processing procedure of the fifth embodiment.
Figure 20B:
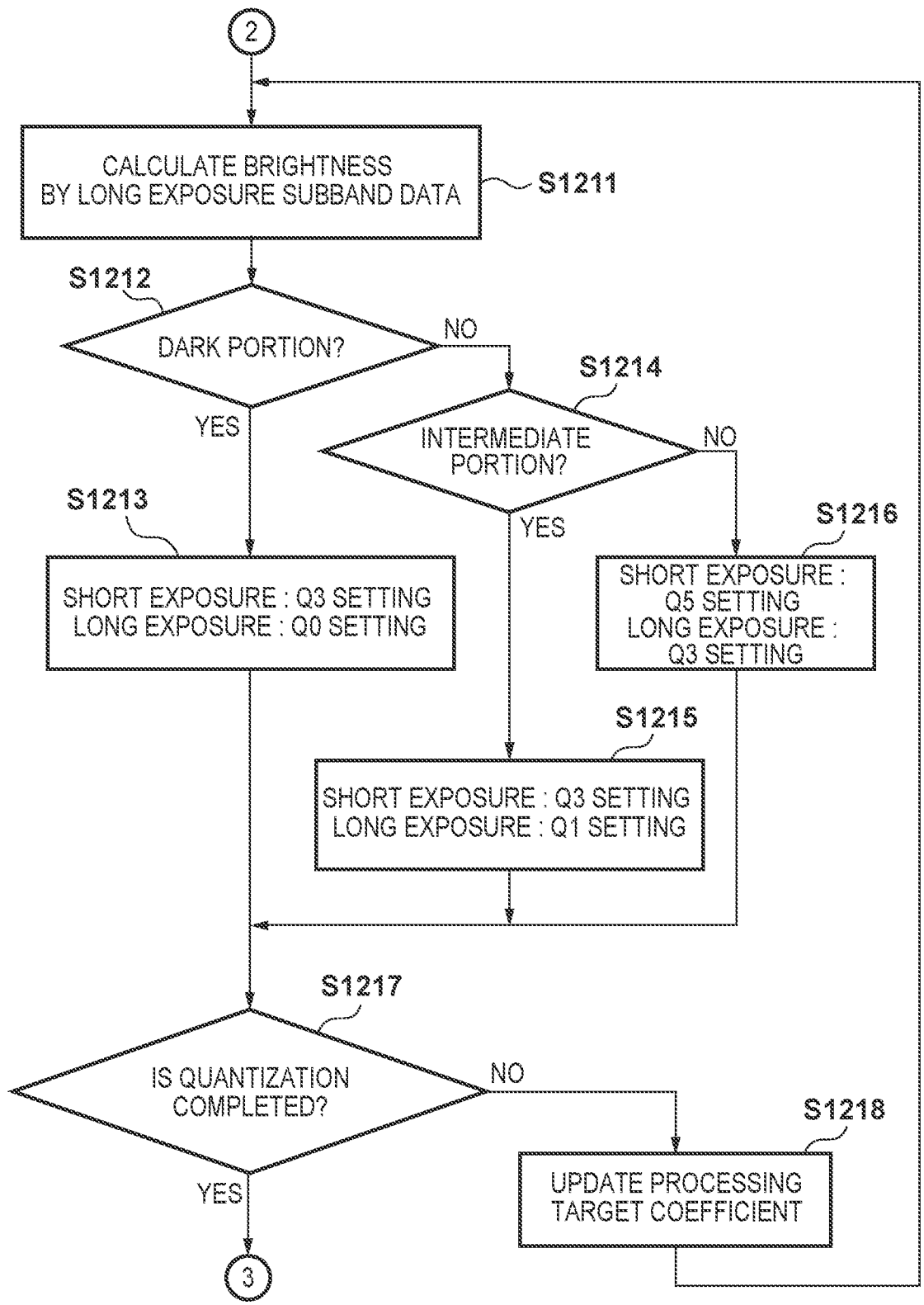
Figure 20C:
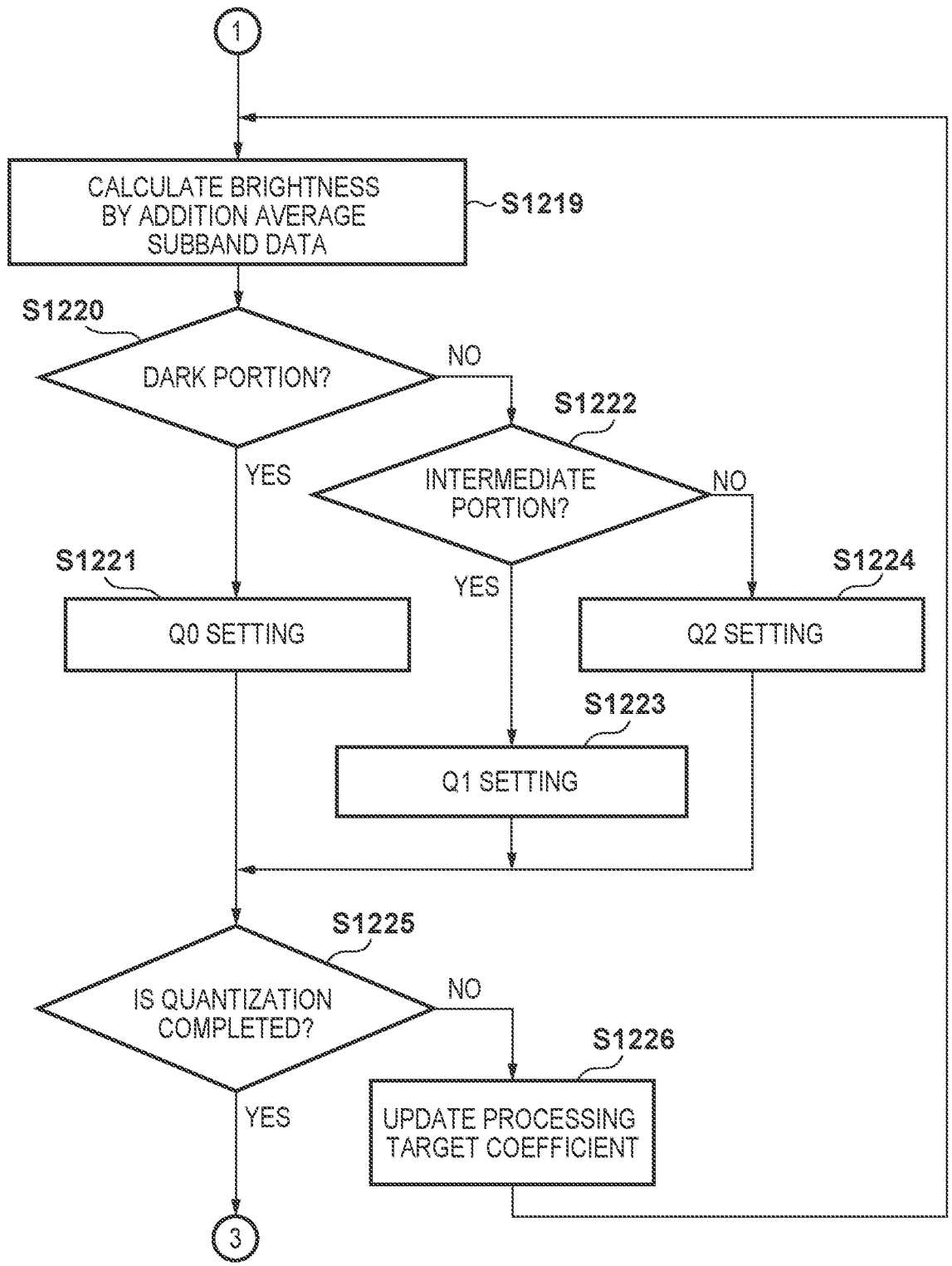

Also, an example of lev=1 is described in the flowcharts shown in FIGS. 20A-20C, but in the case of lev=2 or more, the horizontal and vertical sizes of subband data differ according to lev. Therefore, the calculation unit of the feature amount cannot be the same as the processing unit of quantization. Assume that the feature amount is calculated in units of one coefficient of 2LL subband data at lev=2. In this case, a 2×2 block is to be set as a processing unit of quantization with respect to subband data at lev=1, due to the property of subsampling in frequency resolution.

Also, the size of the coefficient of the 1LL subband data is used as the brightness feature amount, but the feature amount representing the brightness may be generated using other methods such as using an average value or a pixel that is calculated from coefficients of 1LL subband data of a plurality of color components, and there is no limitation to the method described above.

Also, the channel transform unit 1601 has been described using an example in which transformation into four channels is performed for each of color elements of R, G1, G2, and B in the Bayer arrangement, but the color elements of R, G1, G2, and B may further be transformed into four channels using the following transform formulas 29 to 32.

$$Y=(R+G1+G2+B)/4 \qquad \text{Formula 29}$$

$$C0=R-B \qquad \text{Formula 30}$$

$$C1=(G0+G1)/2-(R+B)/2 \qquad \text{Formula 31}$$

$$C2=G0-G1 \qquad \text{Formula 32}$$

The above transform formulas illustrate an exemplary transformation into four channels that are constituted by luminance and color differences. In this case, if control is performed such that the quantization parameter of the luminance component is reduced, and the quantization parameters with respect to the other color difference components are increased, by utilizing the human visual property, the coding efficiency is improved. Note that the number of channels and the transform method are not limited thereto.

Sixth Embodiment

Next, a sixth embodiment will be described. In the sixth embodiment, the method of determining the quantization table for a feature area in which synthesizing ratio is large, with respect to RAW data that is not of correct exposure, is different from that of the first embodiment. In the first embodiment, a fixed pattern that is prepared in advance is set as the quantization table for a feature area, of RAW data that is not of correct exposure, in which the synthesizing ratio is large. Therefore, if each exposure RAW data is obtained by capturing performed at an exposure time that is extremely different from that of correct exposure, a most suitable quantization table cannot be selected according to the brightness, and it is possible that image quality degradation is incurred, or the amount of code is unnecessarily increased. Therefore, in the present embodiment, a method of further increasing the coding efficiency will be described. In the method, with respect to a feature area in which the synthesizing ratio is large, brightness feature determination is also performed on RAW data that is not of correct exposure, and a quantization table that is most suitable according to the feature is selected. Note that the configuration of an image capture apparatus of the sixth embodiment is similar to the configuration of the fifth embodiment, and therefore the description thereof is omitted.

Figure 21A:
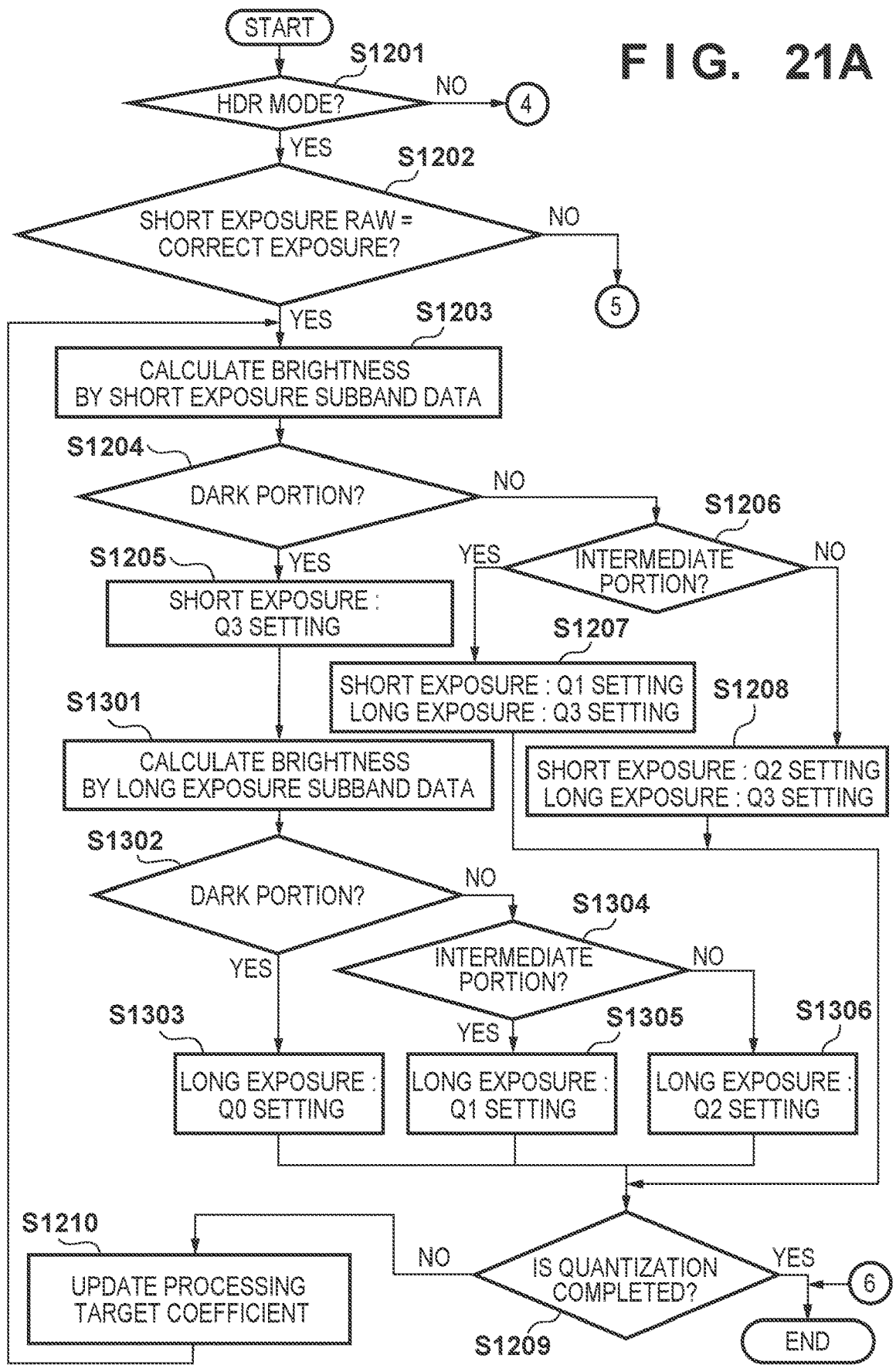
FIGS. 21A to 21C are flowcharts illustrating a quantization processing procedure of a sixth embodiment.
Figure 21B:
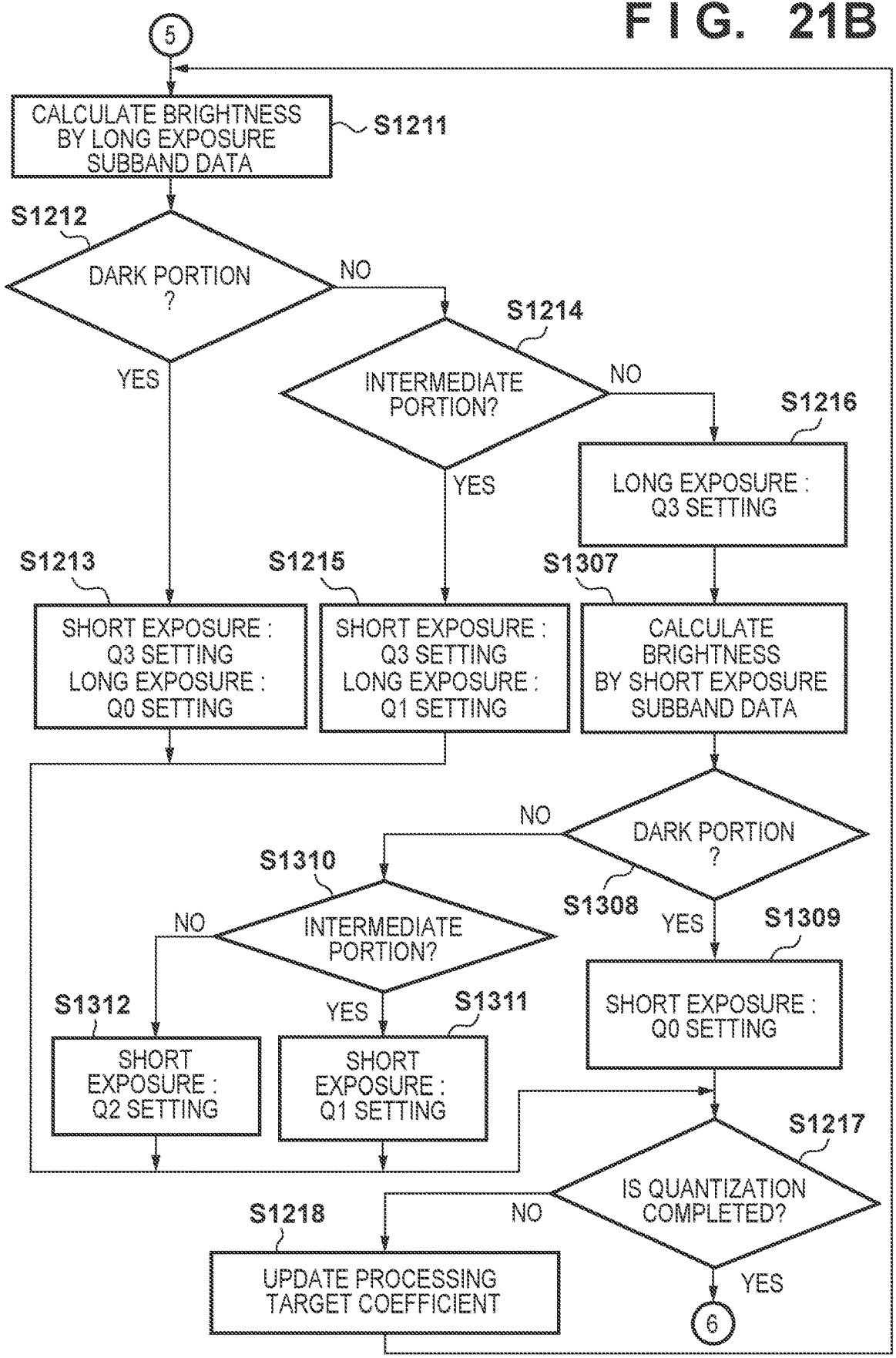
Figure 21C:
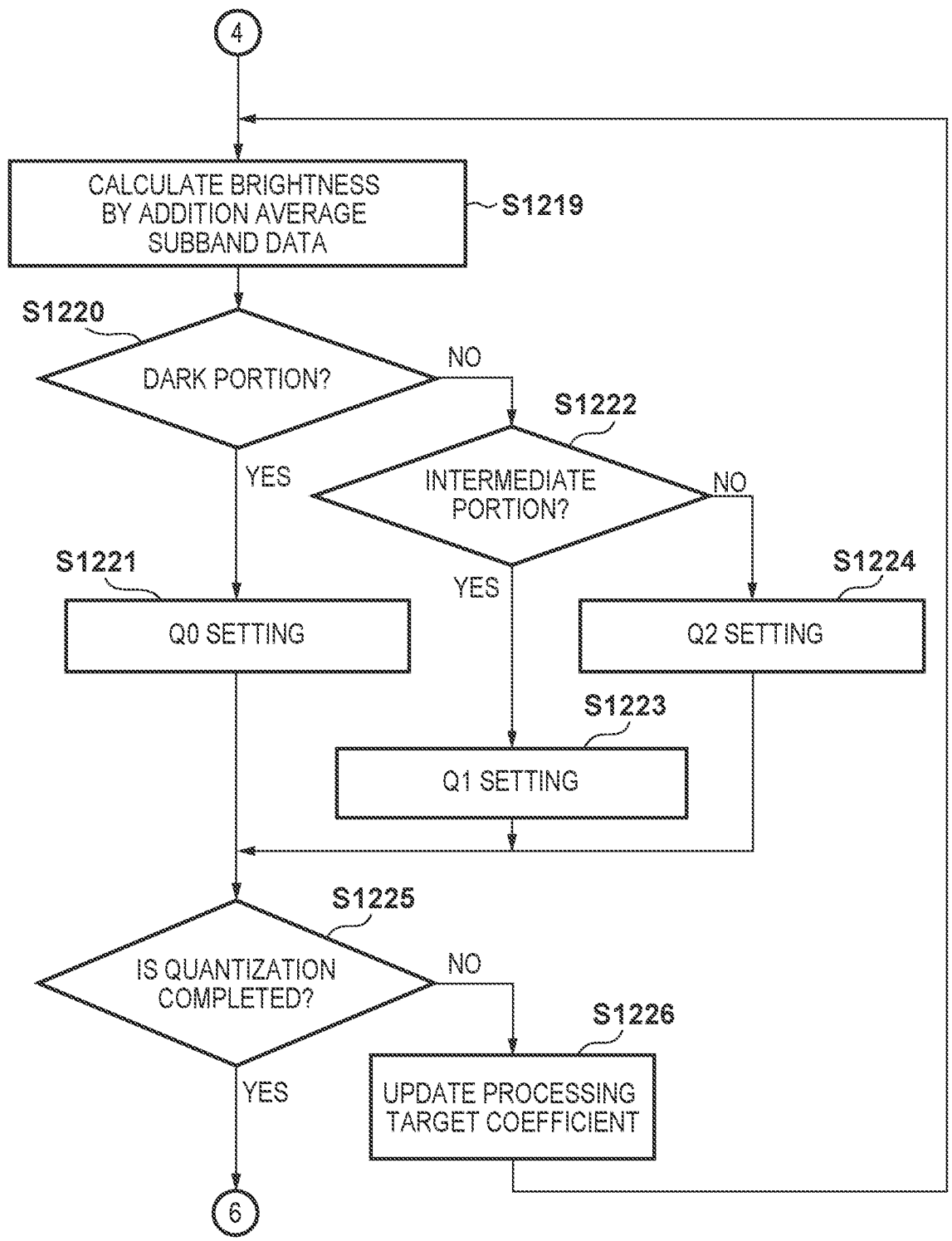

The quantization processing procedure of the present embodiment is shown in FIGS. 21A-21C. The differences from the fifth embodiment are that processing steps S1301 to S1312 are added. The description of processing steps that are similar to those of the fifth embodiment is omitted, and only the differences will be described.

In step S1301, the controller 108 calculates a brightness feature amount using long exposure subband data that is of overexposure. The size of the coefficient of a 1LL subband of the G1 component is used as the brightness feature amount, similarly to the fifth embodiment.

In step S1302, the controller 108 determines whether or not the area of interest is a dark portion based on the magnitude relationship between the brightness feature amount calculated in step S1301 and predetermined threshold values. If it is determined to be a dark portion, the processing is advanced to step S1303, and if not, the processing is advanced to step S1304.

In step S1303, the controller 108 determines that the quantization table for the pieces of color component subband data that constitute the long exposure RAW data is Q0, and executes the quantization processing.

In step S1304, the controller 108 determines whether or not the area of interest is an intermediate portion based on the magnitude relationship between the brightness feature amount calculated in step S1301 and the predetermined threshold values. If it is determined to be an intermediate portion, the processing is advanced to step S1305, and if not, the processing is advanced to step S1306.

In step S1305, the controller 108 determines that the quantization table for the pieces of color component subband data that constitute the long exposure RAW data is Q1, and executes the quantization processing.

In step S1306, the controller 108 determines that the quantization table for the pieces of color component subband data that constitute the long exposure RAW data is Q2, and executes the quantization processing.

In step S1307, the controller 108 calculates the brightness feature amount using short exposure subband data that is of underexposure. The size of the coefficient of a 1LL subband of the G1 component is used as the brightness feature amount, similarly to the fifth embodiment.

In step S1308, the controller 108 determines whether or not the area of interest is a dark portion based on the magnitude relationship between the brightness feature amount calculated in step S1307 and predetermined threshold values. If it is determined to be a dark portion, the processing is advanced to step S1309, and if not, the processing is advanced to step S1310.

In step S1309, the controller 108 determines that the quantization table for the pieces of color component subband data that constitute the short exposure RAW data is Q0, and executes the quantization processing.

In step S1310, the controller 108 determines whether or not the area of interest is an intermediate portion based on the magnitude relationship between the brightness feature amount calculated in step S1307 and the predetermined threshold values. If it is determined to be an intermediate portion, the processing is advanced to step S1311, and if not, the processing is advanced to step S1312.

In step S1311, the controller 108 determines that the quantization table for the pieces of color component subband data that constitute the short exposure RAW data is Q1, and executes the quantization processing.

In step S1312, the controller 108 determines that the quantization table for the pieces of color component subband data that constitute the short exposure RAW data is Q2, and executes the quantization processing.

As described above, as a result of setting a most suitable quantization table according to the brightness with respect to RAW data obtained by capturing performed at an exposure time that is not of correct exposure as well, the coding efficiency can further be improved.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application Nos. 2020-094912, filed May 29, 2020, and No. 2020-188302, filed Nov. 11, 2020 which are hereby incorporated by reference herein in their entirety.

What is claimed is:
1. An apparatus comprising:
at least one processor; and
a memory coupled to the at least one processor, the memory having instructions that, when executed by the at least processor, perform operations as:
a generating unit configured to generate a plurality of pieces of RAW data including RAW data corresponding to a first exposure time and RAW data corresponding to a second exposure time that is longer than the first exposure time from RAW data obtained from a sensor that can perform shooting at an exposure time that is different for each pixel; and
an encoding unit configured to encode the generated plurality of pieces of RAW data,
wherein the generating unit generates difference RAW data from differences between RAW data obtained by applying a gain to RAW data corresponding to one of the first exposure time and the second exposure time and RAW data corresponding to the other of the first exposure time and the second exposure time, and
the encoding unit encodes the difference RAW data and RAW data corresponding to the other of the first exposure time and the second exposure time.

2. The apparatus according to claim 1, wherein the generating unit generates RAW data in a Bayer arrangement structure for each exposure time.

3. The apparatus according to claim 1,
wherein the generating unit generates one piece of RAW data corresponding to the first exposure time by adding a plurality of pieces of pixel data of the first exposure time, and generates one piece of RAW data corresponding to the second exposure time by adding a plurality of pieces of pixel data of the second exposure time.

4. The apparatus according to claim 3, wherein the generating unit generates the one piece of RAW data corresponding to the first exposure time and the one piece of RAW data corresponding to the second exposure time by calculating addition averages of a plurality of pieces of pixel data.

5. The apparatus according to claim 1, wherein the generating unit applies a gain to RAW data corresponding to one of the first exposure time and the second exposure time so as to be closer to RAW data corresponding to the other of the first exposure time and the second exposure time.

6. The apparatus according to claim 1, wherein the generating unit generates the plurality of pieces of RAW data by calculating addition averages of signals of pixels of a same exposure time and a same color that are present in the vicinity.

7. The apparatus according to claim 1, further perform operation as a control unit configured to control the exposure time for each pixel of the sensor,
wherein the generating unit generates the plurality of pieces of RAW data if the exposure time for each pixel changes, and generates one piece of RAW data if the exposure time for each pixel does not change.

8. The apparatus according to claim 7, wherein the generating unit generates, if the exposure time for each pixel does not change, one piece of RAW data by calculating average values of image data of pixels of a same color that are present in the vicinity.

9. An apparatus comprising:
at least one processor; and
a memory coupled to the at least one processor, the memory having instructions that, when executed by the at least processor, perform operations as:
a generating unit configured to generate a plurality of pieces of RAW data including RAW data corresponding to a first exposure time and RAW data corresponding to a second exposure time that is longer than the first exposure time from RAW data obtained from a sensor that can perform shooting at an exposure time that is different for each pixel; and
an encoding unit configured to encode the generated plurality of pieces of RAW data,
wherein the encoding unit determines, using a quantization parameter of RAW data corresponding to one of the first exposure time and the second exposure time as a reference, a quantization parameter of RAW data corresponding to the other of the first exposure time and the second exposure time.

10. The apparatus according to claim 9, wherein the encoding unit determines, using a quantization parameter of RAW data corresponding to the first exposure time as a reference, a quantization parameter of RAW data corresponding to the second exposure time.

11. An apparatus comprising:
at least one processor; and
a memory coupled to the at least one processor, the memory having instructions that, when executed by the at least processor, perform operations as:
a generating unit configured to generate a plurality of pieces of RAW data from RAW data obtained from a sensor that can perform shooting at an exposure time that is different for each pixel; and
an encoding unit configured to encode the generated plurality of pieces of RAW data,
wherein the generating unit generates first RAW data of a first exposure time and second RAW data of a second exposure time,
wherein
the instructions further perform operations as quantization unit configured to quantize the first RAW data and second RAW data,
the encoding unit encodes the first RAW data and second RAW data that have been quantized by the quantization unit, and
the quantization unit determines quantization parameters for the first RAW data and quantization parameters for the second RAW data for respective areas that are classified by brightness of the first RAW data.

12. The apparatus according to claim 11, wherein the quantization unit
determines which of the first RAW data and the second RAW data is of correct exposure,
if the first RAW data is of correct exposure, determines quantization parameters for the first RAW data and quantization parameters for the second RAW data for respective areas that are classified by brightness of the first RAW data, and
if the second RAW data is of correct exposure, determines quantization parameters for the first RAW data and quantization parameters for the second RAW data for respective areas that are classified by brightness of the second RAW data.

13. The apparatus according to claim 12, wherein the first exposure time is shorter than the second exposure time.

14. The apparatus according to claim 13, wherein the quantization unit determines, with respect to the first RAW data, a quantization parameter of an area classified into dark to be a quantization parameter that is larger than a quantization parameter of an area classified into bright, and determines, with respect to the second RAW data, a quantization parameter of an area classified into bright to be a quantization parameter that is larger than a quantization parameter of an area classified into dark.

15. The apparatus according to claim 12,
wherein, when capturing is performed by the sensor at a same exposure time without performing capturing at an exposure time that is different for each pixel,
the generating unit obtains third RAW data obtained by averaging pieces of pixel data of pixels of a same color that are present in the vicinity, the quantization unit determines quantization parameters for the third RAW data for respective areas that are classified by brightness of the third RAW data, and quantizes the third RAW data, and the encoding unit encodes the quantized third RAW data.

16. The apparatus according to claim 15, wherein the quantization unit determines that, if the first RAW data is of correct exposure, the quantization parameter for the first RAW data of an area that is classified as bright is a quantization parameter corresponding to the quantization parameter that is used for an area classified as bright in the third RAW data, and determines that, if the second RAW data is of correct exposure, the quantization parameter for the second RAW data of an area that is classified as dark is a quantization parameter corresponding to the quantization parameter that is used for an area classified as dark in the third RAW data.

17. The apparatus according to claim 16, wherein the quantization unit determines that, if the first RAW data is of correct exposure, the quantization parameter for the first RAW data of an area that is classified as bright is a quantization parameter that is larger than the quantization parameter to be used in the third RAW data, and determines that, if the second RAW data is of correct exposure, the quantization parameter for the second RAW data of an area that is classified as dark is a quantization parameter that is larger than the quantization parameter to be used in the third RAW data.

18. The apparatus according to claim 15, wherein the quantization unit determines that, if the first RAW data is of correct exposure, the quantization parameter for the second RAW data of an area classified as dark is a quantization parameter that is greater than or equal to the quantization parameter to be used for an area that is classified as dark in the third RAW data and is smaller than the quantization parameter to be used for an area that is classified as bright in the third RAW data.

19. The apparatus according to claim 15, wherein the quantization unit determines that, if the second RAW data is of correct exposure, the quantization parameter for the first RAW data of an area classified as bright is a quantization parameter that is less than or equal to the quantization parameter to be used for an area that is classified as bright in the third RAW data and is larger than the quantization parameter to be used for an area that is classified as dark in the third RAW data.

20. The apparatus according to claim 11, wherein the quantization unit performs classification by brightness for each area of the first RAW data or the second RAW data using a first threshold value for determining whether or not to be a dark portion and a second threshold value for determining whether or not to be a bright portion.

21. The apparatus according to claim 11, wherein the area is a square area of one pixel or more.

22. A method comprising:

generating a plurality of pieces of RAW data including RAW data corresponding to a first exposure time and RAW data corresponding to a second exposure time that is longer than the first exposure time from RAW data obtained from a sensor that can perform shooting at an exposure time that is different for each pixel; and encoding the generated plurality of pieces of RAW data, wherein in the generating, difference RAW data are generated from differences between RAW data obtained by applying a gain to RAW data corresponding to one of the first exposure time and the second exposure time and RAW data corresponding to the other of the first exposure time and the second exposure time, and in the encoding, the difference RAW data and RAW data corresponding to the other of the first exposure time and the second exposure time are encoded.

23. A non-transitory computer-readable storage medium storing a program for causing a computer to execute a method, the method comprising:

generating a plurality of pieces of RAW data including RAW data corresponding to a first exposure time and RAW data corresponding to a second exposure time that is longer than the first exposure time from RAW data obtained from a sensor that can perform shooting at an exposure time that is different for each pixel; and encoding the generated plurality of pieces of RAW data, wherein in the generating, difference RAW data are generated from differences between RAW data obtained by applying a gain to RAW data corresponding to one of the first exposure time and the second exposure time and RAW data corresponding to the other of the first exposure time and the second exposure time, and in the encoding, the difference RAW data and RAW data corresponding to the other of the first exposure time and the second exposure time are encoded.

24. A method comprising:

generating a plurality of pieces of RAW data including RAW data corresponding to a first exposure time and RAW data corresponding to a second exposure time that is longer than the first exposure time from RAW data obtained from a sensor that can perform shooting at an exposure time that is different for each pixel; and encoding the generated plurality of pieces of RAW data, wherein in the encoding, using a quantization parameter of RAW data corresponding to one of the first exposure time and the second exposure time as a reference, a quantization parameter of RAW data corresponding to the other of the first exposure time and the second exposure time is determined.

25. A method comprising:

generating a plurality of pieces of RAW data from RAW data obtained from a sensor that can perform shooting at an exposure time that is different for each pixel; and encoding the generated plurality of pieces of RAW data, wherein in the generating, first RAW data of a first exposure time and second RAW data of a second exposure time are generated, quantizing the first RAW data and second RAW data, wherein in the encoding, the first RAW data and second RAW data that have been quantized in the quantizing are encoded, and in the quantizing, quantization parameters for the first RAW data and quantization parameters for the second RAW data for respective areas that are classified by brightness of the first RAW data are determined.

* * * * *